(12) United States Patent
Kim et al.

(10) Patent No.: US 8,612,713 B2
(45) Date of Patent: Dec. 17, 2013

(54) MEMORY SWITCHING CONTROL APPARATUS USING OPEN SERIAL INTERFACE, OPERATING METHOD THEREOF, AND DATA STORAGE DEVICE THEREFOR

(75) Inventors: Bup Joong Kim, Daejeon (KR); Woo Young Choi, Daejeon (KR); Kook Jin Nam, Seoul (KR); Byung Jun Ahn, Daejeon (KR)

(73) Assignee: Electronics & Telecommunications Research Institute (KR)

( * ) Notice: Subject to any disclaimer, the term of this patent is extended or adjusted under 35 U.S.C. 154(b) by 896 days.

(21) Appl. No.: 12/150,953

(22) Filed: May 1, 2008

(65) Prior Publication Data

US 2009/0083457 A1    Mar. 26, 2009

(30) Foreign Application Priority Data

Sep. 21, 2007    (KR) .................... 10-2007-0096879

(51) Int. Cl.
  *G06F 13/14*    (2006.01)
  *G06F 13/00*    (2006.01)
  *G06F 12/00*    (2006.01)

(52) U.S. Cl.
  USPC ........... 711/170; 711/171; 711/172; 711/148; 710/56; 710/242; 710/52

(58) Field of Classification Search
  USPC ............. 710/125, 305, 307, 309, 68, 56, 242, 710/52; 711/148, 172, E12.001, E12.002
  See application file for complete search history.

(56) References Cited

U.S. PATENT DOCUMENTS

| 5,301,278 | A | | 4/1994 | Bowater et al. | |
|---|---|---|---|---|---|
| 5,651,115 | A | * | 7/1997 | Hasebe et al. ................. | 725/115 |
| 5,742,797 | A | * | 4/1998 | Celi et al. ....................... | 345/548 |
| 5,930,484 | A | | 7/1999 | Tran et al. | |
| 6,175,387 | B1 | * | 1/2001 | Han ................................ | 348/565 |
| 6,754,222 | B1 | * | 6/2004 | Joung et al. .................... | 370/412 |
| 6,963,577 | B1 | * | 11/2005 | Tomonaga et al. ............ | 370/412 |
| 7,111,108 | B2 | | 9/2006 | Grundy et al. | |
| 7,539,912 | B2 | * | 5/2009 | Chan et al. ..................... | 714/718 |
| 2002/0161956 | A1 | * | 10/2002 | Kanzaki et al. ................ | 710/240 |
| 2003/0018680 | A1 | * | 1/2003 | Iglesias et al. ................. | 709/100 |
| 2006/0020740 | A1 | | 1/2006 | Bartley et al. | |
| 2007/0133311 | A1 | | 6/2007 | Kim et al. | |

FOREIGN PATENT DOCUMENTS

| KR | 10-0135927 B1 | 1/1998 |
|---|---|---|
| WO | WO 03/021455 A1 | 3/2003 |
| WO | WO 2004/102403 A2 | 11/2004 |
| WO | WO 2005/089418 A2 | 9/2005 |

* cited by examiner

*Primary Examiner* — Mardochee Chery
(74) *Attorney, Agent, or Firm* — Blakely Sokoloff Taylor & Zafman

(57) ABSTRACT

Provided is a memory switching control apparatus using an open serial interfacing scheme capable of enhancing flexibility, reliability, availability, performance in a data communication processes between a memory and a processing unit and an operating method thereof. The memory switching control apparatus includes: one or more processor interfacing units which perform interfacing with one or more processing units; one or more memory interfacing units which have open-serial-interfacing-scheme memory interfacing ports to interface with data storage devices connected to the memory interfacing ports in a serial interfacing scheme; and a plurality of arbitrating units which are provided corresponding to the memory interfacing units to independently arbitrate usage rights of the processor interfacing units to the memory interfacing units.

23 Claims, 14 Drawing Sheets

MEMORY SWITCHING CONTROL APPARATUS USING OPEN SERIAL INTERFACE, OPERATING METHOD THEREOF, AND DATA STORAGE DEVICE THEREFOR

CROSS-REFERENCE TO RELATED APPLICATIONS

This application claims the priority of Korean Patent Application No. 10-2007-0096879 filed on Sep. 21, 2007, in the Korean Intellectual Property Office, the disclosure of which is incorporated herein by reference.

BACKGROUND OF THE INVENTION

1. Field of the Invention

The present invention relates to a memory switching control apparatus using open serial interfacing capable of enhancing flexibility, reliability, availability, and performance in a data communication processes between a memory and a processing unit and an operating method thereof.

The present invention is derived from a research project supported by the IT R&D program of MIC/IITA [2006-S-061-02, IPv6-Based QoS Service and Terminal Mobility Supporting Router Technology].

2. Description of the Related Art

In general, an apparatus including processing units such as personal computers (PC), embedded systems, and portable apparatuses such as mobile phones includes a data storage device for storing processor codes, data, a booting program, an operating system (OS), applications, user's information, log data, and the like. The processing unit fetches the processor codes, the data, the booting program, the OS, the applications, the user's information, and the log data to drive the apparatus.

Since data storage device stores basic information and data for driving the processing unit which may influence performance of the corresponding apparatus, interfacing between the data storage device and the processing unit is important. Particularly, in an embedded system and a server system requiring high availability, a probability of occurrence of problems in the data storage device is relatively high in comparison with other devices.

The data storage device may include various types of memories such as DRAMs and SRAMs and Hard disks, and the type of the data storage devices is becoming diversified. Particularly, due to development of semiconductor technologies, various types of high-speed or low-speed memory devices have been integrated in a single package for small-sized low-power-consumption products.

In addition, as processing units have higher-speed and become parallelized, a stable memory-accessing request in high-frequency-band, memory-accessing requests of controllers in a high-speed input/output (IO) interface, and memory-accessing requests of embedded processing units or a group of processing units occur.

Therefore, various memory interface technologies have been researched so as to satisfy various demands according to high-speed parallelized processing units and to facilitate access of the processing units to various types of data storage devices.

As an example, a high-speed parallelized memory interface for accessing limitlessly the memory of a high-performance processing unit has been proposed. In addition, a technology for increasing the speed thereof has been actively developed.

However, a conventional parallelized memory interface has a limitation to a highest speed since the memory interface is implemented on a printed circuit board (PCB). In addition, since a high-frequency-band clock is included in the parallelized memory interface, synchronization between data and the clock is a difficult task. In addition, since signal characteristics may be slightly varied according to heat, physical impact, vibration, and the like, the synchronization between parallel data and between the data and clock may be unstable or broken down. In order to solve the problem, various types of buffers may be used in the high-speed parallelized memory interface. However, due to the limitation of existing parallelized memory interface scheme, difficulty in design of the memory interface is still remained and increased.

In addition, in case of using a plurality of data storage devices, it is difficult to prevent a bottle neck of data and data input/output delays by using a memory interfacing scheme using a single interface unit. Even in case of using the aforementioned parallelized memory interface scheme, since different interfaces need to be used for different types of memory devices, a complexity in design and implementation of the memory interfaces and the number of pins are increased.

In addition, in a general processor-based apparatus including the processing unit, positions of memory spaces which are used by the processing unit to drive the OS and the applications are fixed in most cases. Therefore, when a memory interface or a memory connected to the memory interface is in disorder, the processing unit cannot operate, so that the entire system may be stopped.

Recently, high-speed IO interfaces have been provided. Therefore, in an apparatus connected to the high-speed IO interface, requests of the processing unit for a usage right to a system memory have been increased. Accordingly, the request of the main processing unit for the usage right to the memory and the requests of the IO interfaces for the usage right to the memory may be issued simultaneously, so that a method capable of distributing the usage rights to the memory effectively has been required.

For example, when peripheral component interfaces (PCIs) connected to an Ethernet controller issues an access request for the system memory, the main processing unit, in order to drive an application, may issue a request for reading program codes from the memory or the memory interface of which access is already required by the Ethernet controller. In this case, due to occurrence of the two access requests, one of the processing units needs to be waiting; otherwise the request needs to be cancelled.

SUMMARY OF THE INVENTION

The present invention provides a memory switching control apparatus using an open serial interfacing scheme and an operating method thereof, capable of preventing a bottle neck of data and data input/output delays associated with using of a plurality of data storage devices and of reducing a complexity in design and implementation of the memory interface.

The present invention also provides a memory switching control apparatus using an open serial interfacing scheme and an operating method thereof, capable of changing addressing spaces of a memory interface flexibly so as to ensure stable operations of a processing unit even in a case where the memory interface or a memory connected to the memory interface is in disorder.

The present invention also provides a memory switching control apparatus using an open serial interfacing scheme and an operating method thereof, capable of preventing any one of the requests from being delayed or canceled in a case where a request of a main processing unit for a usage right to a memory and a request of an IO interface to the memory are simultaneously issued.

The present invention also provides a memory switching control apparatus using an open serial interfacing scheme and an operating method thereof, capable of enhancing flexibility, reliability, availability, and performance in data communication processes between a memory and a processing unit by facilitating connection between different types of data storage devices in the same standard of a serial interfacing scheme, facilitating independent input and output of data through respective memory interfacing ports, and facilitating changing positions of addressing spaces of the memory interfacing ports, and facilitating changing widths of serial interfacing lines.

According to an aspect of the present invention, there is provided a memory switching control apparatus using an open serial interfacing scheme, comprising: one or more processor interfacing units which perform interfacing with one or more processing units; one or more memory interfacing units which have open-serial-interfacing-scheme memory interfacing ports to interface with data storage devices connected to the memory interfacing ports in a serial interfacing scheme; and a plurality of arbitrating units which are provided corresponding to the memory interfacing units to independently arbitrate usage rights of the processor interfacing units to the memory interfacing units.

In the above aspect of the present invention, the memory switching control apparatus may further comprise a memory port table which manages memory start addresses allocated to the memory interfacing units, memory sizes of the data storage devices connected to the memory interfacing ports or memory end addresses allocated thereto, and state information of the memory interfacing units.

In addition, the number of interfacing lines of the memory interfacing units may be varied according to required bandwidths of the connected data storage devices.

According to another aspect of the present invention, there is provided an operating method of a memory switching control apparatus using an open serial interfacing scheme, the memory switching control apparatus having a plurality of processor interfacing units connected to a plurality of processing units, a plurality of memory interfacing units connected to a plurality of data storage devices, and a plurality of arbitrating units arbitrating usage right to the memory interfacing units, the operating method comprising: if an initialization operation is started, driving the memory interfacing units at corresponding lowest speeds so as to check the number of available interfacing lines; checking a highest speed of the checked available interfacing lines; driving all the checked available interfacing lines at the checked highest speed so as to determine whether or not the available interfacing lines operate normally; measuring data delays between the interfacing lines that are determined to operate normally and compensating for the data delays between the interfacing lines; performing a memory test for data storage devices connected to the normally-operated interfacing lines; and if the result of the memory test is normal, allocating system addressing spaces mapped to the data storage devices to each of the memory interfacing units and registering thereof in a memory port table.

In the above aspect of the present invention, the operating method may further comprise: if a reading request issued from an arbitrary processing unit, a corresponding processor interfacing unit buffering a memory address of which reading is requested by the processing unit and a control signal; the processor interfacing unit identifying a memory interfacing unit that is to read data from a currently-registered memory port table by using the buffered memory address information; the processor interfacing unit requesting for a usage right to a memory interfacing port to an arbitrating unit of the identified memory interfacing unit; the arbitrating unit allocating a usage right of a memory interfacing port to the processor interfacing unit according to a usability of the memory interfacing unit and a priority of the processor interfacing unit; applying the memory address and the control signal buffered in the processor interfacing unit through the memory interfacing unit to the data storage device according to the allocation; the memory interfacing unit receiving the reading-requested data from the data storage device; the arbitrating unit identifying the processor interfacing unit that requests for data received by the memory interfacing unit; transferring the data received by the memory interfacing unit to the identified processor interfacing unit; and the processor interfacing unit receiving the data and transferring the data to the corresponding processing unit.

In addition, the operating method may further comprise: if a writing request is issued from an arbitrary processing unit, a processor interfacing unit connected to the processing unit buffering a memory address of which writing is requested by the processing unit, a control signal, and data that are to be written in a memory; the processor interfacing unit identifying a memory interfacing unit corresponding to the memory address by searching the memory port table by using the buffered memory address; the processor interfacing unit requesting for a usage right to a memory interfacing port to an arbitrating unit of the identified memory interfacing unit; the arbitrating unit allocating a usage right of a memory interfacing port to the processor interfacing unit according to a usability of the memory interfacing unit and a priority of the processor interfacing unit; transferring the data, the memory address, and the control signal buffered in the processor interfacing unit which is allocated with the usage right; and the memory interfacing unit transmitting the data, the memory address, and the control signal to the data storage device so as to request for writing.

According to still another aspect of the present invention, there is provided a data storage device comprising: one or more memory devices; and one or more memory interfacing units, each of which an open-serial-interfacing-scheme memory interfacing port separately or commonly connected to the memory devices, wherein the memory interfacing unit receives a predetermined format of data through interfacing lines connected to the memory interfacing port to transfer the data to the memory devices or converts the data read from the memory devices to the predetermined format of data to output the data to the memory interfacing port.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENT

Figure 1:
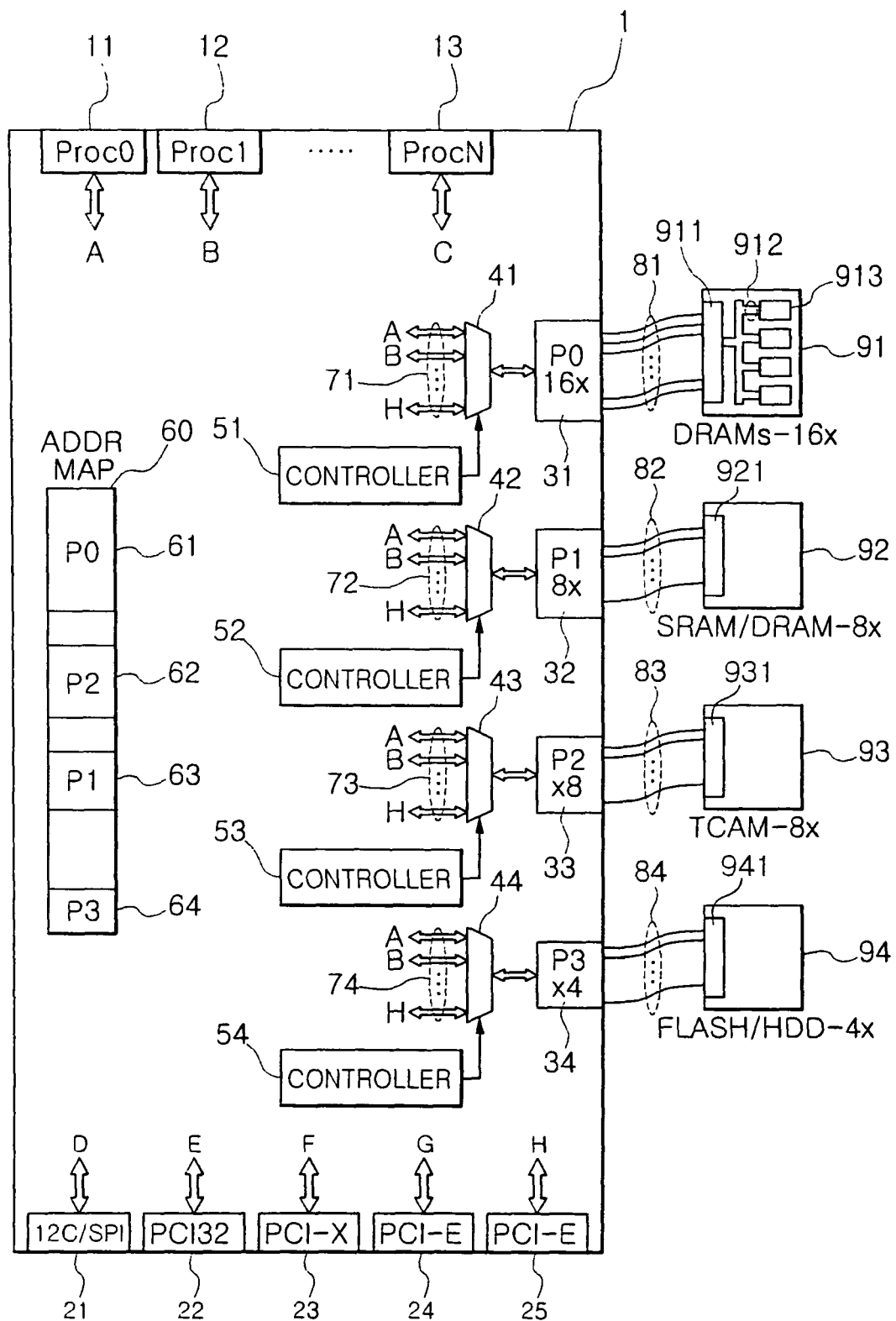
FIG. 1 is a block diagram illustrating a memory switching control apparatus and a data storage device using an open serial interfacing scheme according to an embodiment of the present invention.

Hereinafter, embodiments of the present invention will be described in detail with reference to the accompanying drawings. For clarifying the present invention, detailed description of well-known functions and constructions will be omitted. In the accompanying drawing, elements having similar functions and operations are denoted by the same reference numerals.

In the specification, "connection between an element and another element" includes "indirect connection through still another element therebetween" as well as "direct connection therebetween". In addition, "comprising an element" denotes not excluding other elements but further comprising other elements if there is no specific contrary description.

In a memory switching control apparatus according to the present invention, independent memory interfacing ports and arbitration units are provided so as to arbitrate connection between one or more data storage device including memory and one or more processing units (not shown) and facilitate independent accesses to the data storage devices, so that it is possible to distribute use of the processing units to the memory.

The processing unit may be included together with the memory switching control apparatus in the same apparatus so as to be directly connected to the memory switching control apparatus. Alternatively, the processing unit may be provided to an external apparatus so as to be connected through an external interface to the memory switching control apparatus.

FIG. 1 is a block diagram illustrating a configuration of a memory switching control apparatus according to an embodiment of the present invention.

Referring to FIG. 1, the memory switching control apparatus 1 includes one or more first processor interfacing units 11 to 13 which perform interfacing with one or more internal processing units, one or more second processor interfacing units 21 to 25 which perform interfacing with processing units connected through one or more external interfaces, one or more memory interfacing units 31 to 34 which perform interfacing with data storage devices connected to independent memory interfacing ports, selection units 41 to 44 which select one of the first processor interfacing units 11 to 13 and the second processor interfacing units 21 to 25 to connect the selected one to the memory interfacing units 31 to 34, and one or more controllers 51 to 54 which arbitrates connection of the selection units 41 to 44 according to requests of the first processor interfacing units 11 to 13 and the second processor interfacing units 21 to 25.

The first processor interfacing units 11 to 13 perform interfacing with the processing units (hereinafter, referred to as internal processing units) that are included together with the memory switching control apparatus 1 in the same apparatus so as to be directly connected to the memory switching control apparatus 1 without separate interfaces. When the internal processing units issue memory reading and writing requests, the first processor interfacing units 11 to 13 searches for the corresponding memory interfacing units 31 to 34 to request for usage rights. If the usage rights corresponding to the memory reading and writing requests are allocated, the first processor interfacing units 11 to 13 receive reading requested data and control signals from the processing unit and transmit the data and the control signals to the memory interfacing units 31 to 34. In addition, the first processor interfacing units 11 to 13 transfer writing-requested data and control signals transmitted from the memory interfacing units 31 to 34 to the corresponding processing units.

The internal processing units may be implemented as an external unit which is separated from the memory switching control apparatus 1 or as an internal unit which is included together with the memory switching control apparatus 2.

The second processor interfacing units 21 to 25 perform memory-access interfacing through the external interfaces. For example, the second processor interfacing units 21 to 25 may be a serial interface (I2C/SPI) interfacing unit 21, a PCI 32-bit interfacing unit 22, a PCI 64-bit or PCI-X interfacing unit 23, and PCI-E interfacing units 24 and 25. The second processor interfacing units 21 to 25 perform the memory-access interfacing from external apparatuses connected through I2C/SPI and PCI.

The memory interfacing units 31 to 34 perform serial interfacing with data storage devices 91 to 94. The memory interfacing units 31 to 34 are connected to memory interfacing units 911, 921, 931, and 941 of the data storage devices 91 to 94 in a port-to-port scheme. The number of interfacing lines and interfacing speeds of the memory interfacing units 31 to 34 may be defined differently or identically. In addition, the number of interfacing lines of the memory interfacing units 31 to 34 may be defined fixedly or variably. The configuration and operations of the memory interfacing units 31 to 34 will be described later more in detail with reference to the accompanying drawings.

The memory interfacing units 31 to 34 are connected to the first processor interfacing units 11 to 13 and the second processor interfacing units 21 to 25 through the selection units 41 to 44 via an internal bus of the memory switching control apparatus 1.

The selection units 41 to 44 and the controllers 51 to 54 are independent arbitration unit s for allowing independent accesses to the plurality of data storage devices. The selection units 41 to 44 and the controllers 51 to 54 have a function of distributing use of memories by the processing units.

The selection units 41 to 44 select a use-allowed bus from among a bundle of buses connected to the first processor interfacing units 11 to 13 and the second processor interfacing units 21 to 25 and connect the selected bus to buses connected to the memory interfacing units 31 to 34. At this time, the controllers 51 to 54 connected to each of the selection units 41 to 44 control selection operations of the selection units 41 to 44.

The controllers 51 to 54 adjust usage rights of the memory interfacing port based on information of usability and access priority of the first processor interfacing units 11 to 13 and the second processor interfacing units 21 to 25 to memory interfacing ports and control the selection operations of the selection units 41 to 44 based on the memory-interfacing-port usage rights.

According to the operations of the controllers 51 to 54 and the selection units 41 to 44, the first processor interfacing units 11 to 13 and the second processor interfacing units 21 to 25 are connected to specific memory interfacing units 31 to 34 so as to use the corresponding memory interfacing ports.

The information of the usability and the access priority to the memory interfacing ports are stored in specific registers and managed and changed by the controllers 51 to 54.

In addition, the controllers 51 to 54 analyze data which the memory interfacing units 31 to 34 receive from the data storage devices 91 to 94 and search for destinations of the data. The controllers 51 to 54 control the selection units 41 to 44 so as for the data to be transmitted to the destinations.

In the memory switching control apparatus 1 having the aforementioned configuration, positions and sizes occupied by the memory interfacing units 31 to 34 in a system addressing space 60 are varied according to capacities of the data storage devices 91 to 94 connected to the memory interfacing units 31 to 34. For example, the memory interfacing unit 31 may be configured to occupy a 2 GB addressing space 61 starting from address 0xA_address. The memory interfacing unit 32 may be configured to occupy a 100 GB addressing space 62 starting from address 0xB_address. The memory interfacing unit 33 may be configured to occupy a 1 GB addressing space 63 starting from address 0xC_address. The memory interfacing unit 34 may be configured to occupy a 30 GB addressing space 64 starting from address 0xD_address. If needed, positions of start addresses of memory interfacing units 31 to 34 may be varied.

The system addressing space is configured in initialization operations for the memory interfacing units 31 to 34. The system addressing space is managed using a memory port table (not shown) used by the first and second processor interfacing units 11 to 13 and 21 to 25. The memory port table is used to manage start addresses, sizes, and states of memories allocated to the data storage devices connected to the plurality of memory interfacing ports configured in the memory switching control apparatus 1. The memory port table may be included in the first and second processor interfacing units 11 to 13 and 21 to 25. Alternatively, the memory port table may be implemented in a register which is commonly accessed by the first and second processor interfacing units 11 to 13 and 21 to 25. The memory port table will be described more in detail with reference to the accompanying drawings.

Any types of the data storage devices 91 to 94 that are connected to the memory switching control apparatus 1 can be used. The data storage devices 91 to 94 includes serial interfacing scheme interfacing units (hereinafter, referred to as memory interfacing units) (911, 921, 931, and 941) that are connected to the memory switching control apparatus 1. The memory interfacing units 911, 921, 931, and 941 have the same functions as those of the memory interfacing units 31 to 34 of the memory switching control apparatus 1.

As examples of the data storage devices connected to the memory switching control apparatus 1, there are a data storage device 92 which is implemented by connecting a group of several single-type memory devices 913 through a parallel bus 912 to a serial interfacing port 43 and data storage devices 92 to 94 which are implemented by connecting a single memory device to one serial interfacing port. In addition, as examples of the memory devices of the data storage devices 91 to 94, there are a DRAM, an SRAM, an SDRAM, a TCAM, a flash memory, a HDD, and the like.

The memory switching control apparatus 1 having the aforementioned configuration can efficiently adjust access between the plurality of data storage devices 91 to 94 connected to the memory interfacing units 31 to 34 and a plurality of internal processing units connected to the first processor interfacing units 11 to 13 between the plurality of data storage devices 91 to 94 and a plurality of external processing units connected to the second processor interfacing units 11 to 13. Detailed configuration and operations thereof will be described later in detail.

Recently, as the development of semiconductor technologies and small-sized and power-consumption products, many application products (hereinafter, multiple-data storage devices) which include two or more different-type or equal-type, high-speed or low speed memory devices in one package have been provided. Therefore, the memory switching control apparatus 1 can also be efficiently used for the multiple-data storage devices.

Figure 2:
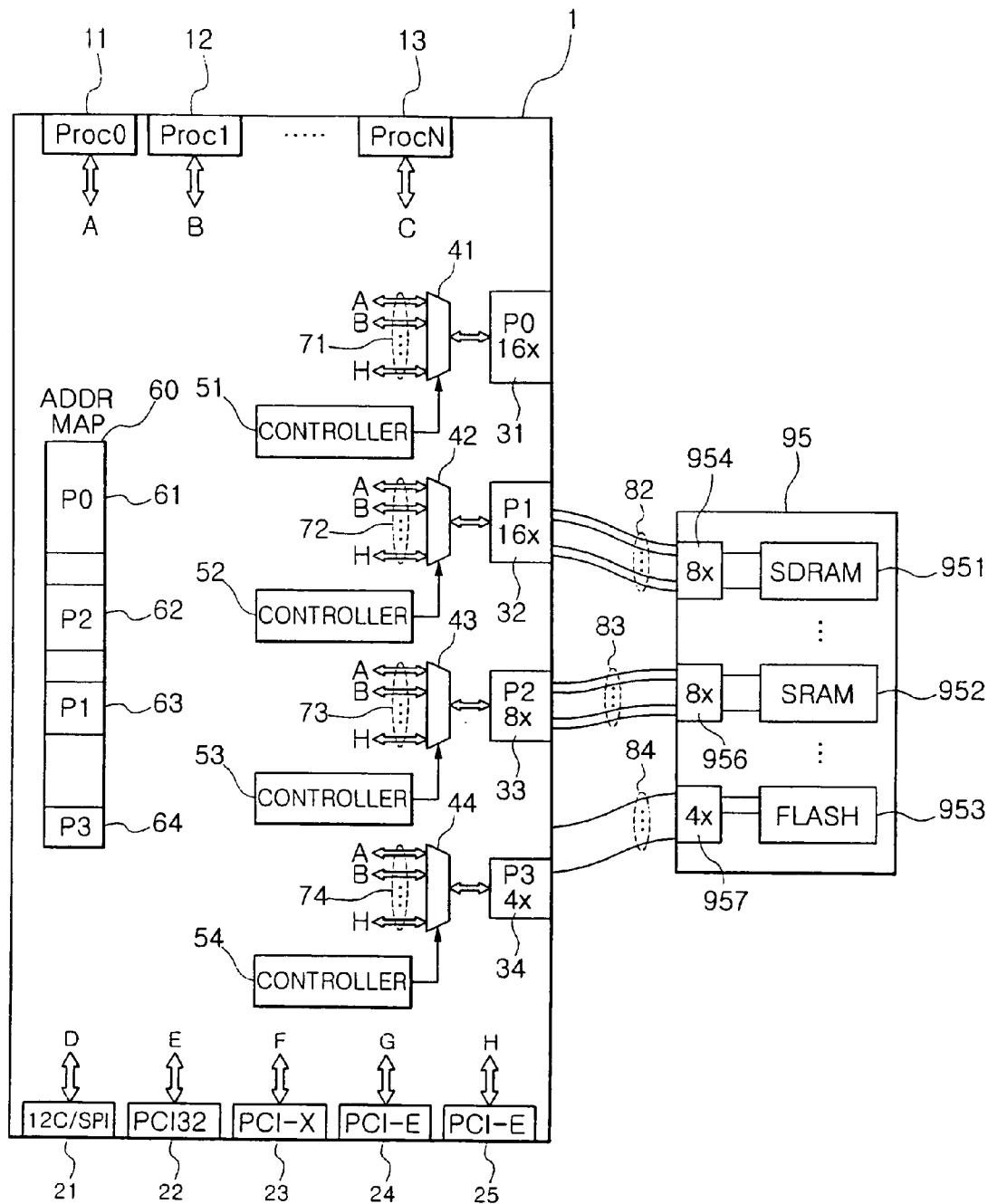
FIG. 2 is a block diagram illustrating a memory switching control apparatus and a data storage device using an open serial interfacing scheme according to another embodiment of the present invention.

FIG. 2 is a block diagram illustrating a memory switching control apparatus 1 according to another embodiment of the present invention.

Referring to FIG. 2, a multiple-data storage device 95 is constructed by connecting different-type or equal-type, high-speed or low speed memory devices or data storage devices 951 to 953 to independent memory interfacing units 954 to 957. The memory devices or data storage devices 951 to 953 can be independently used.

The a plurality of independent memory interfacing units 954 to 957 included in the multiple-data storage device 95 are connected to the memory interfacing units (for example, memory interfacing units 32 to 34) of the memory switching control apparatus 1. The internal or external processing units connected to the first processor interfacing units 11 to 13 and the second processor interfacing units 21 to 25 of the memory switching control apparatus 1 can access independently all of the plurality of different-type or equal-type, high-speed or low speed memory devices or data storage devices 951 to 953 of the multiple-data storage device 95 through the memory switching control apparatus 1.

Each of the memory device or data storage devices 951 to 953 of the multiple-data storage device 95 communicates data with the memory interfacing units 32 to 34 of the memory switching control apparatus 1 by using the number of interfacing lines and speeds corresponding to a required bandwidth of each storage device.

In another example of the multiple-data storage device 95, each of the memory device or data storage devices 951 to 953 may be connected to an independent memory interfacing unit. Alternatively, two or more memory devices or data storage devices may be combined to a group and then connected to the memory interfacing unit.

According to the aforementioned embodiment, in a current state that, due to development of semiconductor technologies, small-sized versatile memories and memory storage devices been actively developed, the memory switching control apparatus 1 can reduce a bottle neck in a port-to-port data communication using independent ports, implement fine distributing processes and pipelining for a processor, reduce the number of pins and the size of a package by using the open serial interfacing lines, and facilitate design of lines according to bandwidths of the memory devices, so that various types of memories or memory storage devices can be integrated in a single package.

Figure 3:
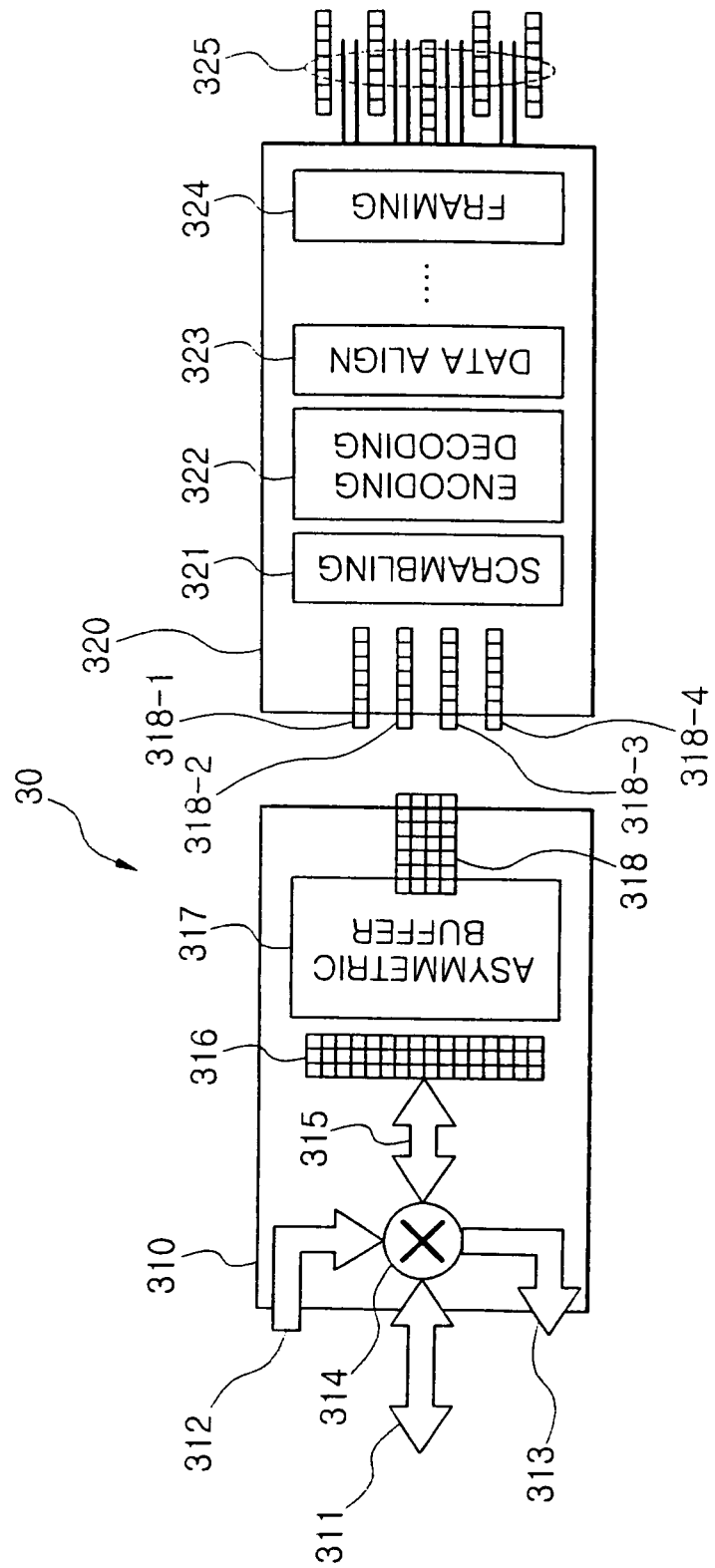
FIG. 3 is a block diagram illustrating a configuration of a memory interfacing unit adapted to the memory switching control apparatus and the data storage device.

FIG. 3 is a block diagram illustrating a configuration of a memory interfacing unit adapted to the memory switching control apparatus and the data storage device.

Referring to FIG. 3, the memory interfacing unit 30 enables the memory switching control apparatus and the data storage devices to perform data communication through interfacing lines. The memory interfacing unit 30 mainly includes a link unit 310 which is connected to internal bus of the memory switching control apparatus and the data storage devices to perform conversion between internal bus data and interfacing line packets and a physical-layer processor 320 which is disposed between the link unit 310 and external interfacing lines to perform physical-layer processes on transmitted and received interfacing line packets.

The link unit 310 includes a data input/output bus 311 through which reading data or writing data are inputted and outputted, a control input bus 312 through which reading or writing control signals are inputted, a control output bus 313 through which the reading or writing control signals are outputted, a data mixing/extracting unit 314 which mixes the data and control signals inputted from the data input/output bus 311 and the control input bus 312 to output memory packets or extracts data and control signals from the inputted memory packets to output the data and the control signals to the data input/output bus 311 and the control output bus 313, and an asymmetric buffer unit 317 which performs conversion between the memory packets and the interfacing line packets corresponding to a predetermined number of interfacing lines.

The control signals which are inputted or outputted through the control input bus 312 and the control output bus 313 include memory addresses, control signals, and state signals associated with reading and writing requests.

In a case where the memory interfacing unit 30 is provided to the memory switching control apparatus 1, the data input/output bus 311, the control input bus 312, and the control output bus 313 of the link unit 310 are connected to the selection units 41 to 44. In a case where the memory interfacing unit 30 is provided to the data storage devices 91 to 95, the data input/output bus 311, the control input bus 312, and the control output bus 313 are connected to the internal memory devices or the data storage devices.

The data mixing/extracting unit 314 combines the data and the memory addresses, the control signals, and the state signals inputted from the data input/output bus 311 and the control input bus 312 to generate memory packets 316 in a predetermined memory data format and transmits the memory packets to the asymmetric buffer unit 317 through a bus 315. In addition, the data mixing/extracting unit 314 receives the memory packets 316 outputted from the asymmetric buffer unit 317 through the bus 315 and extracts the memory addresses, the control signals, and the state signals from the memory packets 316. Then, the data mixing/extracting unit 314 outputs the data to the data input/output bus 311, the memory addresses, control signals, and the state signals to the control output bus 313.

The asymmetric buffer unit 317 has a function of temporarily storing the memory packets 316 inputted through the bus 315 and a function of adjusting a data width of the memory packets 316 corresponding to an interfacing line width and outputting the data. The data of which width is adjusted corresponding to the interfacing line width are called interfacing line packets 318. In addition, the asymmetric buffer unit 317 has a function of temporarily storing the interfacing line packets 318 inputted from external interfacing lines and a function of adjusting a data width of the interfacing line packets 318 and outputting the data in a format of the memory packets 316. In the asymmetric buffer unit 317, an input port and an output port are asymmetrically disposed, so that the temporary storing function and the data-width conversion function can be performed. Detailed configuration and operations thereof will be described later in detail.

The data inputted and outputted between the link unit 310 and the physical-layer processor 320 maintains the format of the interfacing line packets 318.

The physical-layer processor 320 performs a series of processes on the interfacing line packets 318 inputted and outputted between the link unit 310 and the interfacing lines, corresponding to bit lines 318-1 to 318-4. The physical-layer processor 320 includes at least one of a scrambling/descrambling unit 321, an encoding/decoding unit 322, a data aligning unit 323, and a framing/deframing unit 324.

The scrambling/descrambling unit 321 performs data conversion and recovery which is commonly regulated in the interfacing ports of the data storage device side in order to reduce electro-magnetic interference (EMI) caused from repetitive generation of data having an identical pattern.

The encoding/decoding unit 322 performs encoding and decoding of a series of data patterns so as to facilitate clock synchronization for the data patterns, to maintain DC voltage balance of the interfacing lines, and to limit a frequency band of the data patterns.

The data aligning unit 323 compensates for data delays between the interfacing lines. That is, the data aligning unit 323 compensates for the data delays during actual data communication based on input and output data delays of the interfacing lines, which are measured through input and output of the predetermined data patterns in an initialization operation of the memory interfacing unit 30.

The framing/deframing unit 324 has a function of attaching or detaching start information and end information of the signal to or from data 325 inputted and outputted through the interfacing lines for physical data communication.

Figure 4A:
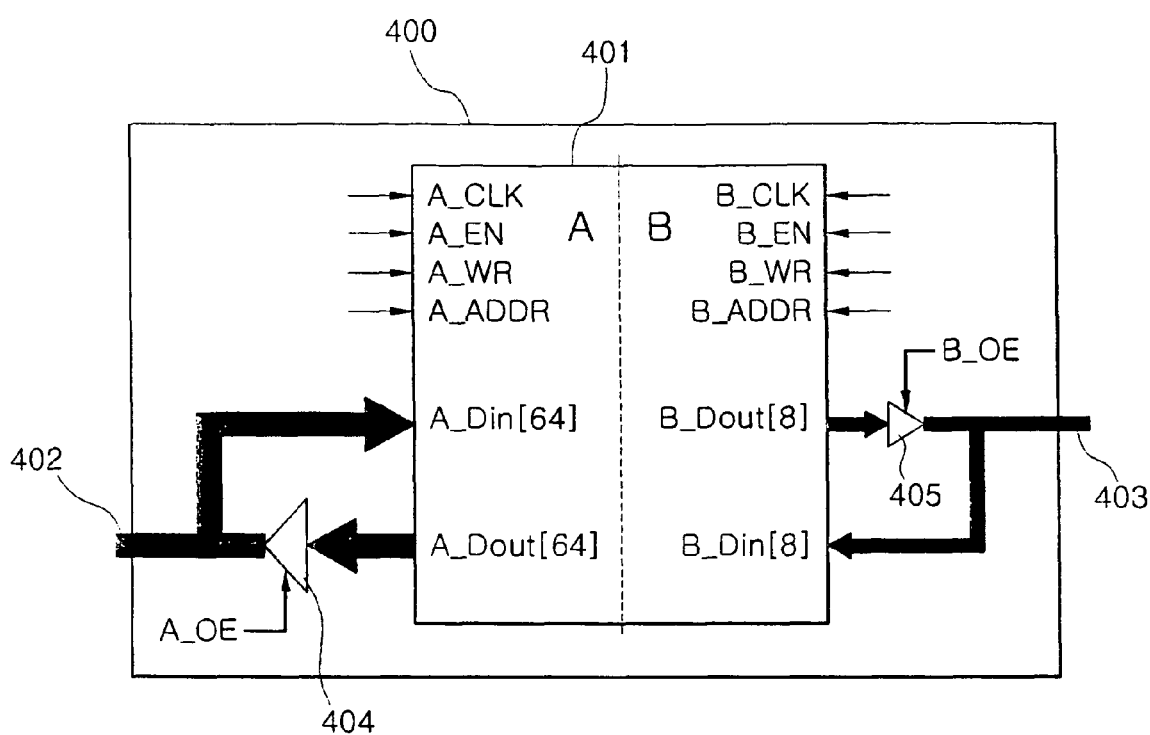
FIGS. 4A and 4B are block diagrams illustrating an embodiment of an asymmetric buffer unit of the memory interfacing unit.
Figure 4B:
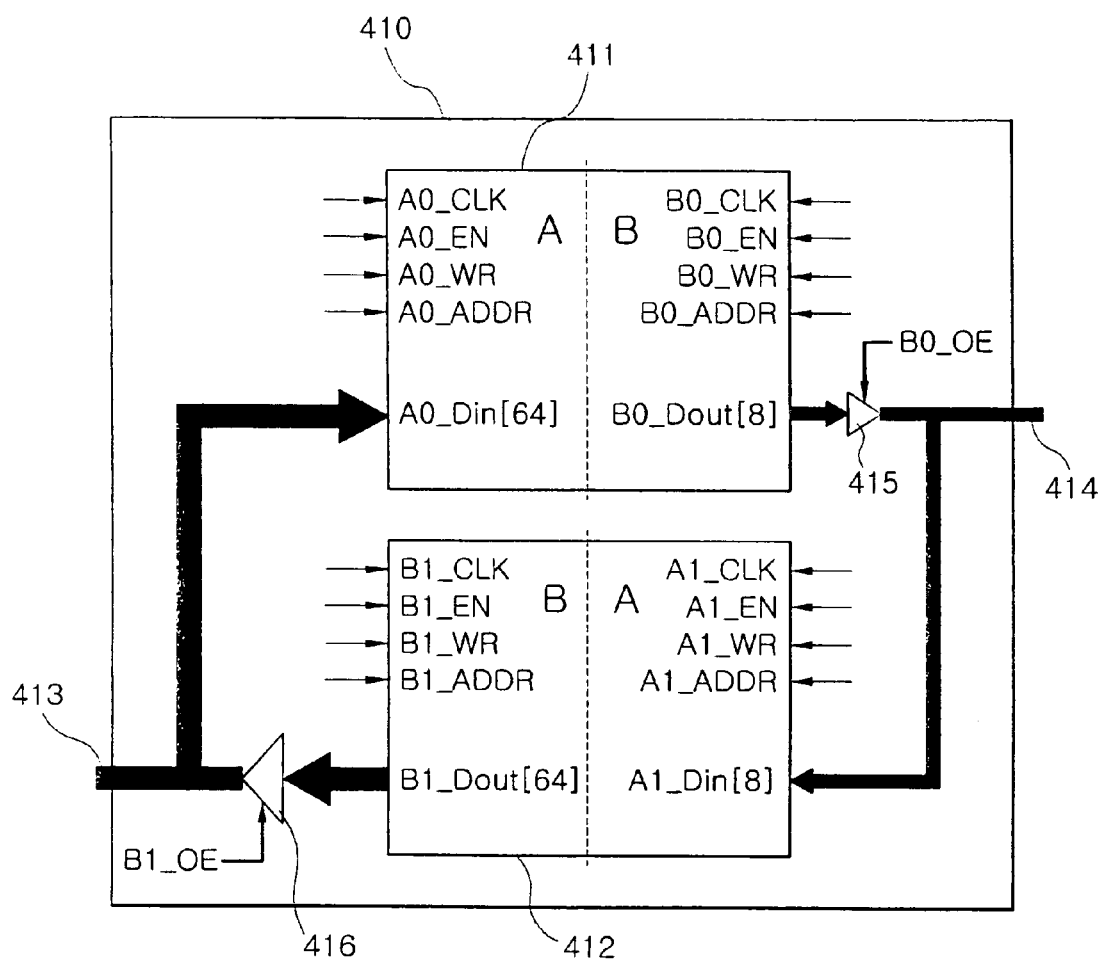

FIGS. 4A and 4B are block diagrams illustrating examples of an asymmetric buffer unit of the memory interfacing unit 30 according to an embodiment of the present invention.

Referring to FIG. 4A, the asymmetric buffer unit 400 includes an asymmetric bidirectional data buffer 401 and an input/output control circuit.

The asymmetric bidirectional data buffer 401 may be implemented by using a dual-port RAM, a first-input-first-output (FIFO) device, or the like. Input and output configurations of the asymmetric bidirectional data buffer 401 are divided into an A side and a B side which are asymmetric to each other. The A side is provided with ports A_Din[64] and A_Dout[64] through which the memory packets 402 are inputted and outputted and ports A_CLK, A_EN, A_WR, and A_ADDR through which clock signals, enable signals, writing signals, buffer address signals for controlling the input and output of the memory packets 402 are inputted. The B side is provided with ports B_Dout[8] and B_Din[8] through which the interfacing line packets 403 are inputted and outputted and ports B_CLK, B_EN, B_WR, and B_ADDR through which clock signals, enable signals, writing signals, buffer address signals for controlling the input and output of the interfacing line packets 403 are inputted. In addition, if needed, the asymmetric bidirectional data buffer 401 may be constructed so that additional control signals such as reading control signals, parity control signals, internal-data-number control signals, and buffer state control signals can be inputted to the A side and the B side.

The input/output control circuit controls flows of the memory packets 402 and the interfacing line packets 403 inputted and outputted through the asymmetric bidirectional data buffer 401. The input/output control circuit is constructed with 3-state buffers 404 and 405 which operate in an open state or a normal state according to control signals A_OE and B_OE.

The 3-state buffers 404 and 405 are connected to output ports A_Dout[64] and B_Dout[8]) of memory packets and interfacing line packets of the asymmetric bidirectional data buffer 401. When the memory packets 402 and the interfacing line packets 403 are inputted, the 3-state buffers 404 and 405 operate in the open state. When the memory packets 402 and the interfacing line packets 403 are outputted, the 3-state buffers 404 and 405 operate in the normal state. Accordingly, the 3-state buffers 404 and 405 can control the input and output flows of the memory packets and the interfacing line packets.

In the embodiment of FIG. 4A, in a case where data are outputted toward the interfacing lines, the asymmetric buffer unit 400 receives 64-bit memory packets 402 through the port A_Din[64] of the A side and temporarily stores the memory packets 402. The asymmetric buffer unit 400 outputs the stored data in units of 8 bits through the port B_Dout[8] of the B side in the order of input. Accordingly, the data outputted from the ports B_Dout[8] of the B side become the interfacing line packets 403 of which data width is adjusted to be 8 bits. On the contrary, in a case where the data are inputted from the interfacing lines, the asymmetric buffer unit 400 receives the 8-bit interfacing line packets through the port B_Din[8] of the B side and temporarily stores the interfacing line packets. The asymmetric buffer unit 400 outputs the temporarily-stored data in units of 64 bits through the port A_Dout [64] of the A side in the order of input. Accordingly, the asymmetric buffer unit 400 converts the 8-bit interfacing line packets to the 64-bit memory packets or converts the 64-bit memory packets to the 8-bit interfacing line packets.

FIG. 4B illustrates another embodiment of an asymmetric buffer unit of the memory interfacing unit 30. The asymmetric buffer unit of FIG. 4B is implemented by using two asymmetric bidirectional data buffers unlike the asymmetric buffer unit of FIG. 4A which is implemented by using one asymmetric bidirectional data buffer.

Referring to FIG. 4B, the asymmetric buffer unit 410 includes two asymmetric bidirectional data buffers 411 and 412 and an input/output control circuit.

Each of the two asymmetric bidirectional data buffers 411 and 412 is divided into a side for converting memory packets 413 to interfacing line packets 414 and a side for converting the interfacing line packets 414 to the memory packets 413. In order words, each of the two asymmetric bidirectional data buffers 411 and 412 is divided into a side for data width conversion of the data outputted to the interfacing lines and a side for data-width conversion of the data inputted from the interfacing lines.

An A side of the asymmetric bidirectional data buffer 411 which processes the data outputted to the interfacing lines is provided with a port A0_Din[64] through which the memory packets 413 are inputted and ports A0_CLK, A0_EN, A0_WR, and A0_ADDR through which clock signals, enable signals, writing signals, and buffer address signals for controlling the input of the memory packets 413 are inputted. A B side of the asymmetric bidirectional data buffer 411 is provided with a port B0_Dout [8] through which the interfacing line packets 414 are outputted and port B0_CLK, B0_EN, and B0_ADDR through which clock signals, enable signals, and buffer address signals for controlling the output of the interfacing line packets 414 are inputted. Accordingly, the asymmetric bidirectional data buffer 411 receives and stores 64-bit memory packets 413 and outputs 8-bit interfacing line packets 414.

On the other hand, an A side of the asymmetric bidirectional data buffer 412 which processes the data inputted from the interfacing lines is provided with a ports A1_Din[8] through which the interfacing line packets 414 are inputted and ports A1_CLK, A1_EN, A1_WR, and A1_ADDR through which clock signals, enable signals, writing signals, and buffer address signals for controlling the input of the interfacing line packets 414 are inputted. A B side of the asymmetric bidirectional data buffer 412 is provided with a port B1_Dout [64] through which the memory packets 413 are outputted and ports B1_CLK, B1_EN, and B1_ADDR through which clock signals, enable signals, and buffer address signals for controlling the output of the memory packets 413 are inputted. Accordingly, the asymmetric bidirectional data buffer 412 receives and stores 8-bit interfacing line packets 414 and outputs 64-bit memory packets 413.

The input/output control circuit is constructed with two 3-state buffers 415 and 416 which are connected to an output port B0_Dout [8] of interfacing line packets and a output ports B1_Dout [64] of memory packets of the two asymmetric bidirectional data buffers 411 and 412. The two 3-state buffers 415 and 416 operate in an open state or a normal state according to control signals B0_OE and B1_OE. When the memory packets and the interfacing line packets are inputted, each of the two 3-state buffers 415 and 416 operates in the open state. When the memory packets and the interfacing line packets are outputted, each of the two 3-state buffers 415 and 416 operates in the normal state. Accordingly, the two 3-state buffers 415 and 416 can control the date to flow normally.

In addition, if needed, the two asymmetric bidirectional data buffers 411 and 412 may be constructed so that additional control signals such as reading control signals, parity control signals, internal-data-number control signals, and buffer state control signals can be inputted to the A side and the B side.

In addition, if needed, the memory interfacing unit 30 may be constructed so that the interfacing line width, that is, the number of interfacing lines can be varied.

Figure 5:
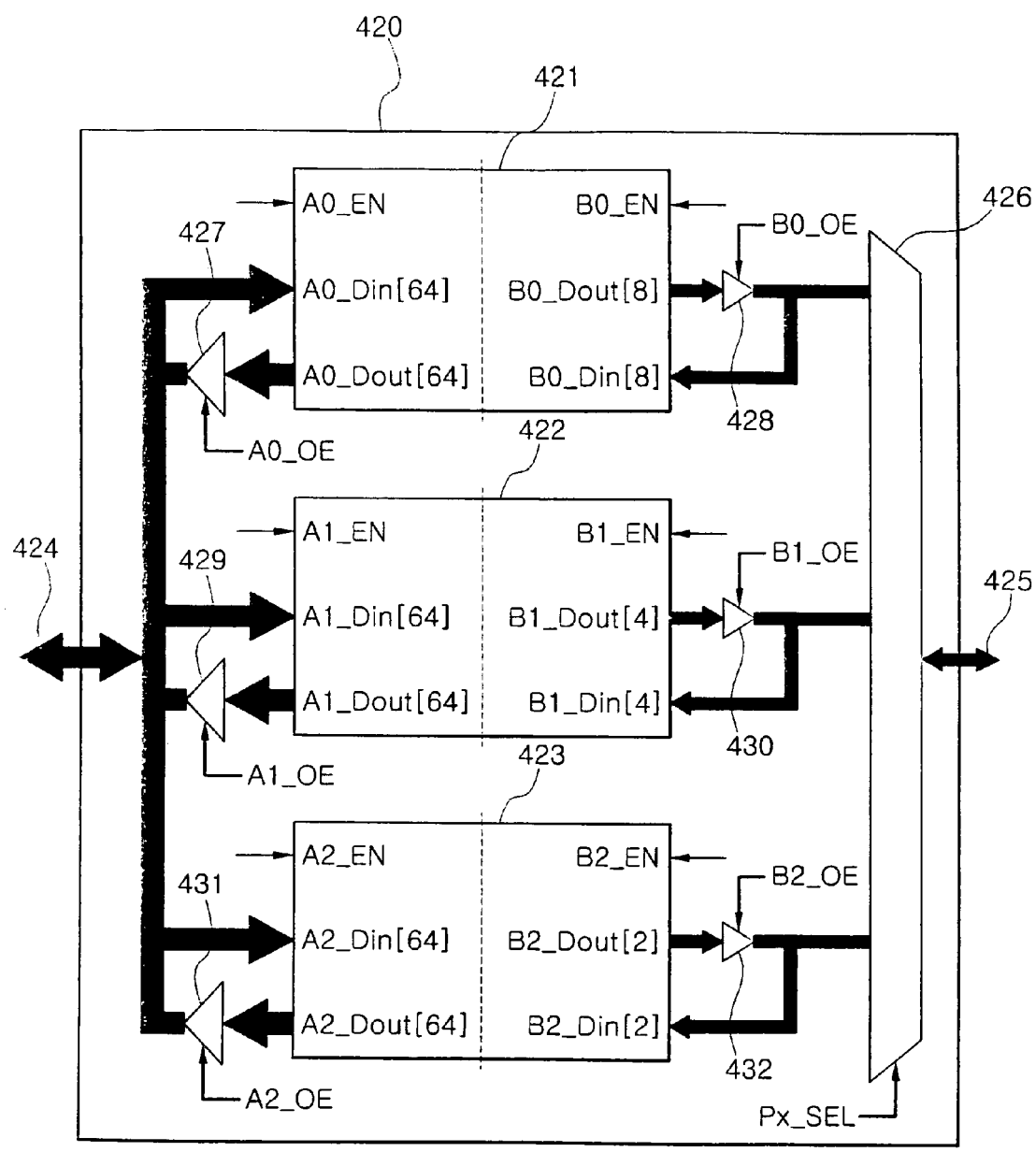
FIG. 5 is a block diagram illustrating another embodiment of an asymmetric buffer unit of the memory interfacing unit.

FIG. 5 is a block diagram illustrating another embodiment of an asymmetric buffer unit of the memory interfacing unit, which is used for variable serial line interfacing.

Referring to FIG. 5, an asymmetric buffer unit 420 includes a plurality of asymmetric bidirectional data buffers 421 to 423 which are provided to change interfacing line widths of interfacing lines flexibly between data storage devices and a memory switching control apparatus, a selector 426 which selects and outputs interfacing line packets 425 from one of the asymmetric bidirectional data buffers 421 to 423, and a plurality of 3-state buffers 427 to 432 which controls data input and output flows of the asymmetric bidirectional data buffers 421 to 423.

The asymmetric bidirectional data buffers 421 to 423 are designed to have different numbers of output bits of the interfacing line packets in order to implement variable serial interfacing.

In the embodiment of FIG. 5, the asymmetric bidirectional data buffer 421 supports 8 interfacing lines, the asymmetric bidirectional data buffer 422 supports 4 interfacing lines, and the asymmetric bidirectional data buffer 423 supports 2 interfacing lines. Accordingly, the interfacing line widths can be changed among three interfacing line widths.

The asymmetric bidirectional data buffers 421 to 423 perform the same operations as those of the asymmetric bidirectional data buffer 401 in the embodiment shown in FIG. 4A. Therefore, each of the asymmetric bidirectional data buffers 421 to 423 is designed to perform both the input and output operations of the memory packets and the interfacing line packets. Alternatively, instead of the asymmetric bidirectional data buffers 421 to 423, a plurality of groups of the two asymmetric bidirectional data buffers 411 and 412 may be provided.

As the operations of the asymmetric buffer unit 420, at the time of the initialization operation of the memory interfacing unit 30, the asymmetric buffer unit 420 checks the interfacing line widths of the currently-connected interfacing lines and determines the interfacing line widths supported by the memory interfacing unit 30 based on the checked interfacing line widths. Then, the asymmetric buffer unit 420 applies a selection control signal Px_SEL to the selector 426 according to the determined interfacing line widths so that the asymmetric bidirectional data buffer (for example, 421) corresponding to the determined interfacing line widths can be selected. Then, the asymmetric buffer unit 420 applies enable signals A0_EN and B0_EN to the A side and the B side of the selected asymmetric bidirectional data buffer 421 according to the data input and output of the interfacing lines and controls operation states of the 3-state buffer of the A side and the 3-state buffer of the B side.

For example, if the interfacing line width of the interfacing lines connected to the memory interfacing unit 30 is 4, the asymmetric bidirectional data buffer 422 is selected. When the data are outputted to the interfacing lines, the enable signal A1_EN is applied to the A side of the asymmetric bidirectional data buffer 422 to be activated, and the control signal A1_OE is applied to the 3-state buffer 429 to be in the open state. Accordingly, the data are inputted to the port A1_Din[64] of the asymmetric bidirectional data buffer 422 to be stored. Then, according to output timings of the interfacing lines, the enable signal B1_EN is applied to the B side of the asymmetric bidirectional data buffer 422 to be activated, and the control signal B1_OE is applied to the 3-state buffer 430 to be in the normal state. Accordingly, the data stored in the asymmetric bidirectional data buffer 422 are outputted through the port B1_Dout [4] of the B side and inputted through the 3-state buffer 430 to the selector 425, and the data are outputted from the selector 425 to the interfacing line bus 425. On the contrary, when the data are inputted from the interfacing lines, the enable signal B1_EN is applied to the B side of the asymmetric bidirectional data buffer 422, and the control signal B1_OE is applied to the 3-state buffer 430 to be in the open state. Accordingly, the data inputted from the interfacing lines through the selector 425 are inputted through the port B1_Din[4] of the B side of the asymmetric bidirectional data buffer 422 to be stored. Then, according to the output timings of the memory packets, the enable signal A1_EN is applied to the A side of the asymmetric bidirectional data buffer 422, and the control signal A1_OE is applied to the 3-state buffer 429 to be in the normal state. Accordingly, the data stored in the asymmetric bidirectional data buffer 422 are outputted through the port A1_Dout[64] to be transferred to the integrated bus 424.

Accordingly, the asymmetric buffer unit 420 can change the interfacing line widths and control the data input and output flows freely.

Figure 6:
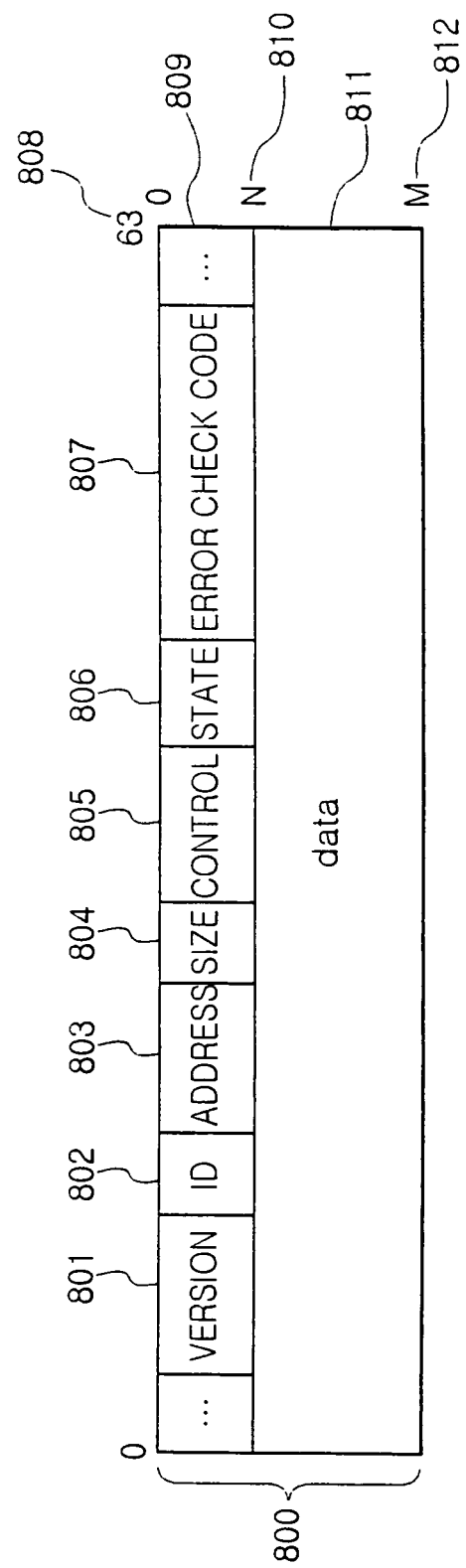
FIG. 6 is a view illustrating a configuration of a memory packet used for a memory switching control apparatus and a data storage device according to the present invention.

FIG. 6 is a view illustrating an example of a memory packet 800 generated by the memory interfacing unit 30.

Referring to FIG. 6, the memory packet 800 mainly includes an information block 809 and a data block 811. The information block 809 includes at least one of interfacing scheme version information 801, an identifier (ID) 802 for indicating an entity of requesting for memory access and a sequence number, a memory address 803, a data size 804, a control information 805, a state information 806, and an error check code 807. Some portions of the information may be added or omitted according to a type of data and varied details.

The memory interfacing unit 30 combines memory addresses, control signals, state signals, and data received from a processing unit issuing a reading request or a writing request or a memory to generate the memory packet 800 in the aforementioned format. When the memory packet 800 is received, the memory interfacing unit 30 decomposes the memory packet 800 based on the information included in the memory packet 800 so as for the processing unit or the memory to receive the memory packet 800.

The ID 802 included in the information block 809 is generated by combining information of an interfacing unit of the entity issuing the reading request and the writing request, that is, the processor interfacing unit and specific request sequence information of the processor interfacing unit.

A width 808 of the memory packet 800 is defined based on an internal bus width of the memory interfacing unit and input and output data widths of the asymmetric buffer. A size 810 of the information block 809 of the memory packet 800 is defined in such a range that a bandwidth between the memory switching control apparatus and the data storage devices cannot be greatly consumed and information required for highly-reliable data communication can be included. In addition, a size 812 of the data block 811 of the memory packet 800 may be defined to be fixed. Otherwise, a maximum size of the data block 811 is defined, and a desired size within the maximum size is used to be transmitted.

Figure 7:
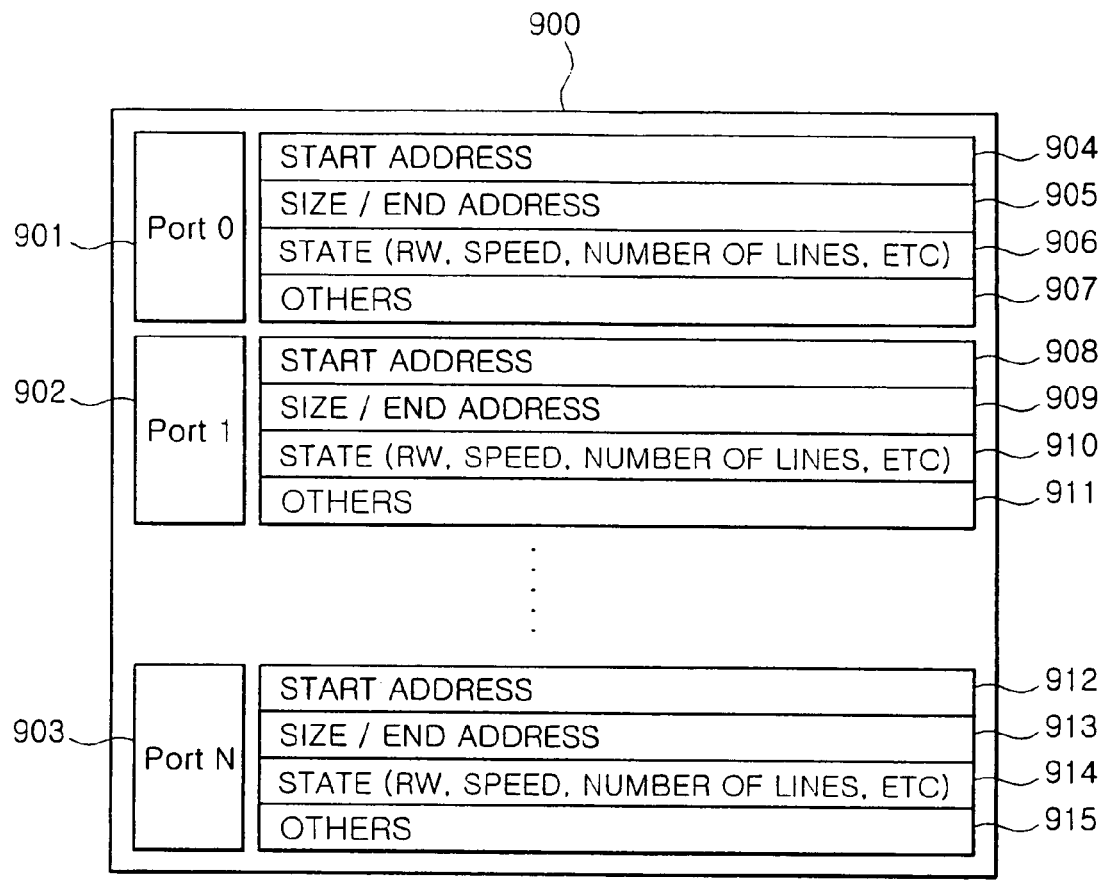
FIG. 7 is a block diagram illustrating an embodiment of a memory port table used for a memory switching control apparatus according to the present invention.

FIG. 7 is a block diagram illustrating an example of a memory port table 900 used for the memory switching control apparatus according to the present invention.

The memory port table 900 is set in the initialization operation of each of the memory interfacing units 31 to 34 of the memory switching control apparatus 1 and used by the first and second processor interfacing units 11 to 13 and 21 to 25 connected to the processing units. By changing information of the memory port table 900, system addressing spaces allocated to the memory interfacing units can be changed, and memory reading and writing rights of the processing units to the memory interfacing units can be controlled.

Referring to FIG. 7, the memory port table 900 performs management associated with each of the memory interfacing units 901, 902, and 903 which are provided to the memory switching control apparatus 1 for connection to the data storage devices. More specifically, the memory port table 900 manages start address information 904, 908, and 912 of system addressing regions allocated to the memory interfacing units, physical sizes of memories connected to the memory interfacing units, end address information 905, 909, and 913 of system addressing regions allocated to the memory interfacing units, state information 906, 910, and 914 of the memory interfacing units such as reading and writing availabilities, speed, and the number of interfacing lines, and other information 907, 911, and 915.

Now, arbitration operations of the memory switching control apparatus 1 between the internal and external processing units and the memory interfacing units will be described.

Figure 8:
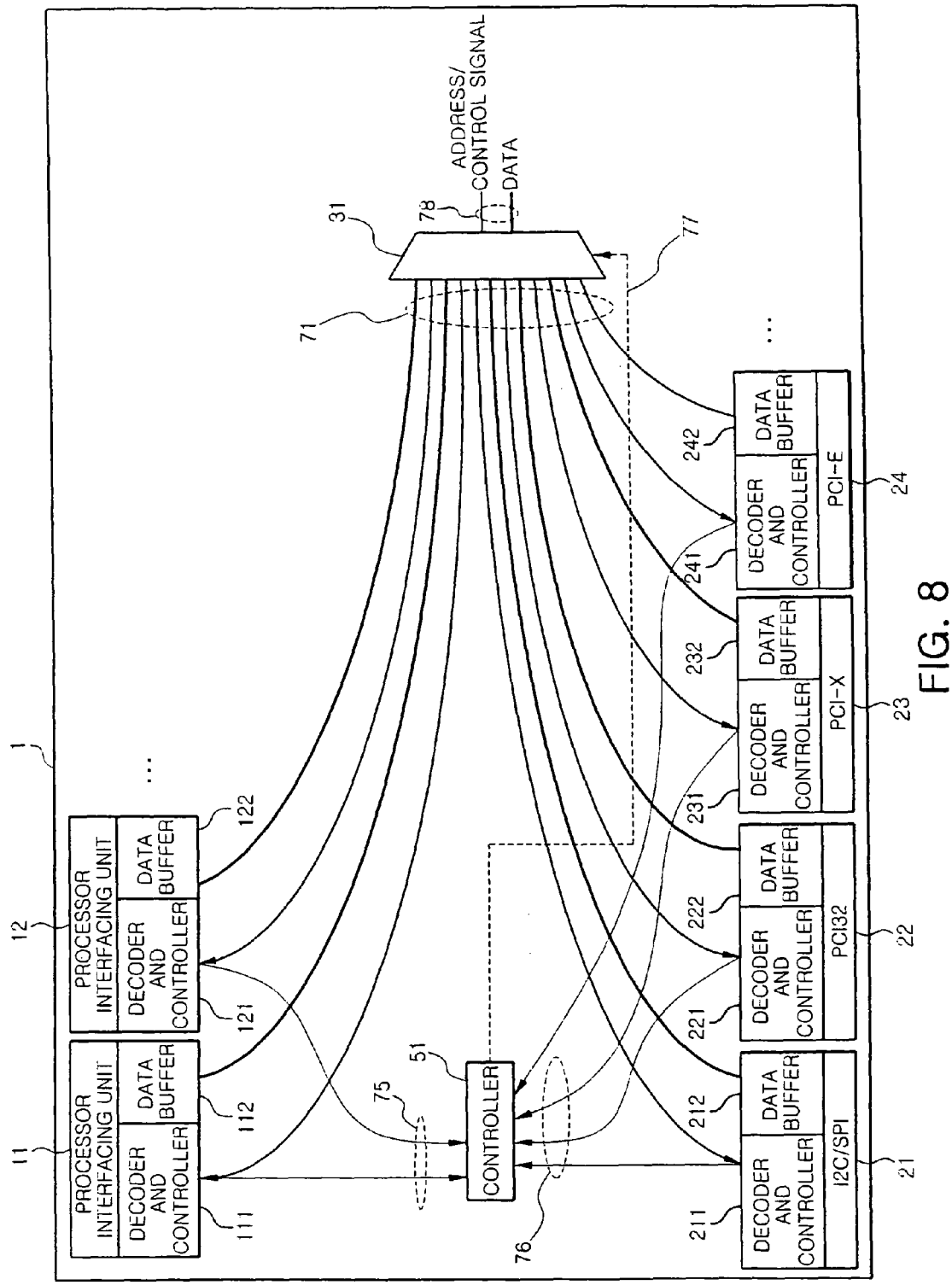
FIG. 8 is a view for explaining a configuration and operations for perform arbitration for memory interfacing units in the memory switching control apparatus according to the present invention.

FIG. 8 is a detailed partial view of the memory switching control apparatus 1 for explaining connection configuration between the first and second processor interfacing units 11 to 13 and 21 to 25 and the selection units 41 to 44 and the controller (51~55) shown in FIG. 1. Although some of the components shown in FIG. 1 are described for the convenience of description, it should be noted that other components that are not described can operate in the same manner described later. In addition, detailed connection between the memory interfacing units 31 to 34 of the memory switching control apparatus 1 and one or more of the first and second processor interfacing units 11 to 13 and 21 to 25 connected to the processing units can be understood based on the following description.

Referring to FIG. 8, each of the first and second processor interfacing units 11, 12, and 21 to 24 includes corresponding decoders and controllers 111, 121, 211, 221, 231, and 241 which analyze addresses and control signals applied by the internal and external processing units to select the memory interfacing units and adjust data exchange timings for the memory interfacing units and corresponding data buffers 112, 122, 212, 222, 232, and 242 which temporarily store the data, the memory addresses, the control signals, and the state signals inputted and outputted from and to the internal and external processing units and adjust data widths and speeds according to the internal bus of the memory switching control apparatus 1.

The memory switching control apparatus 1 selects the memory interfacing unit that is to be connected to the processor interfacing unit that requests for a usage right according to current usabilities of the memory interfacing units 31 to 34, importances of the memory interfacing units 31 to 34, and selection policy. The selection operation is performed by controllers 51 to 54 provided corresponding to the memory interfacing units 31 to 34.

Referring to FIG. 8, the controller 51 receives usage-right-request signals from the decoders and controllers 111, 121, 211, 221, 231, and 241 of the first and second processor interfacing units 11, 12, and 21 to 24 and applies a selection control signal to the selection unit 41.

The selection unit 41 is connected through a bundle of control buses and data buses 71 to the decoders and controllers 111, 121, 211, 221, 231, and 241 and the data buffers 112, 122, 212, 222, 232, and 242. In addition, the selection unit 41 is connected to the memory interfacing unit 31 and an integrated bus 78 through which the addresses, control signals, and data are inputted and outputted. In addition, the selection unit 41 connects one of bus bundles connected to the decoders and controllers 111, 121, 211, 221, 231, and 241 and the data buffers 112, 122, 212, 222, 232, and 242 to the integrated bus 78 under the control of the controller 51.

In the above configuration, the controller 51 receives usage right-request signals for the memory interfacing ports issued by the first and second processor interfacing units 11, 12, and 21 to 24 and transmits to the selection unit 41 control signals for selecting the control bus and the data bus of the processor interfacing unit of which request for the usage right is accepted according to the predetermined selection policy so as to connect the integrated bus 78 connected to the memory interfacing unit 31 to the control bus and the data bus of the processor interfacing unit of which request for the usage right is accepted. At this time, each of the first and second processor interfacing units 11, 12, and 21 to 24 includes corresponding memory port tables containing information including locations of addressing regions allocated to the memory interfacing units as shown in FIG. 7. Therefore, when receiving reading and writing requests to specific addresses from the internal and external processing units, the first and second processor interfacing units 11, 12, and 21 to 24 can transfer the usage right-request signals for the memory interfacing ports to the controllers for controlling the corresponding memory interfacing units.

Now, operations of the memory switching control apparatus 1 having the aforementioned configuration will be described with reference to flowcharts shown in FIGS. 9 to 11. Although operations are sequentially shown in FIGS. 9 to 11 for the convenience of description thereof, it should be noted that the operations are not always sequentially operated. That is, the operations may be performed in a changed order thereof or in a parallel processing manner or the operation according to a type of information or types of the operations.

Figure 9:
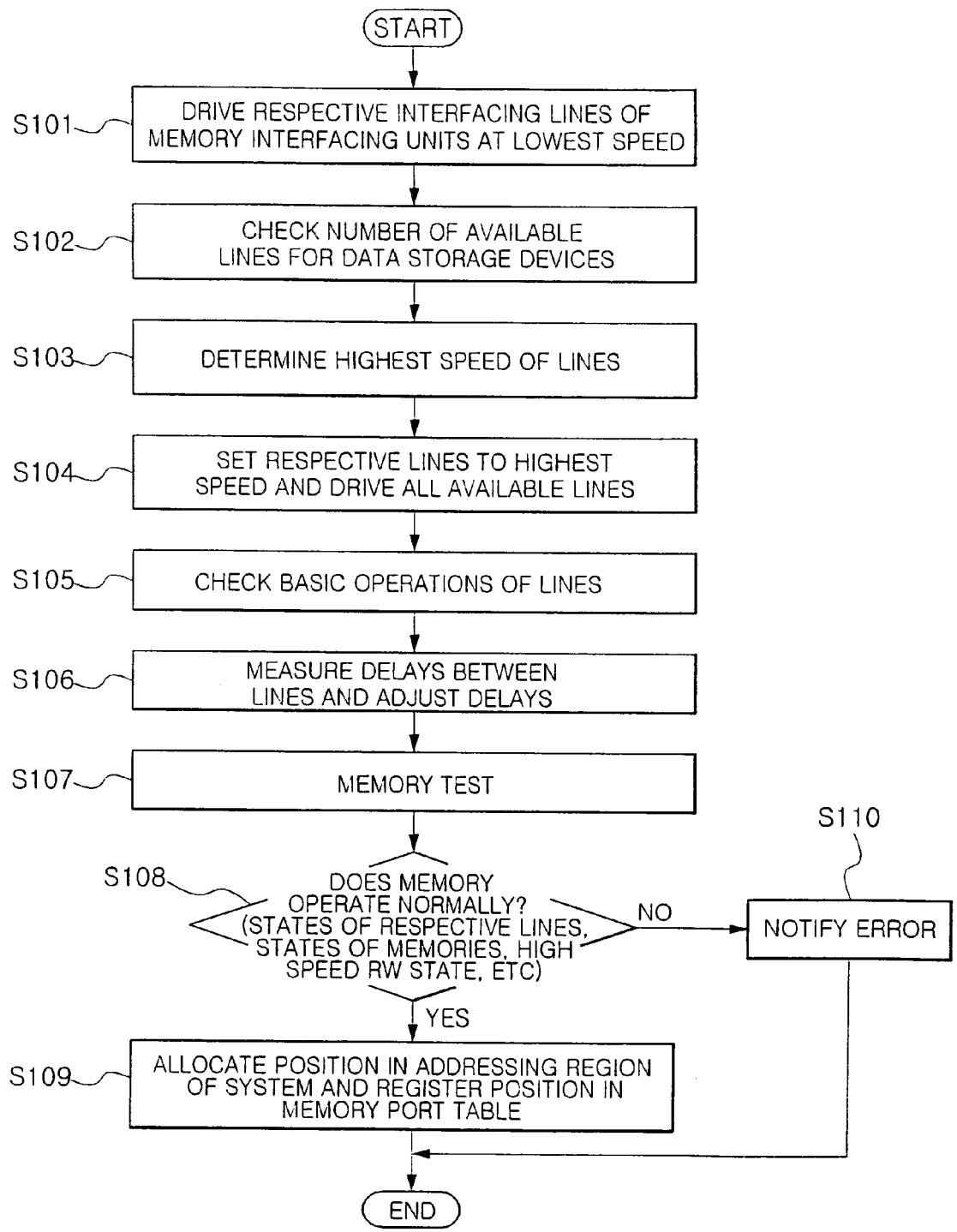
FIG. 9 is a flowchart illustrating an initialization operation of the memory switching control apparatus according to the present invention.

FIG. 9 is a flowchart illustrating an initialization operation of the memory switching control apparatus 1 according to an embodiment of the present invention.

Referring to FIG. 9, when being powered on, being reset, or receiving an initialization command, the memory switching control apparatus 1 starts the initialization operation.

If the initialization operation starts, the memory interfacing units 31 to 34 of the memory switching control apparatus 1 drive the interfacing lines at a lowest speed for the initial driving thereof (S101) and checks the number of interfacing lines that can be used by the currently-connected data storage devices, that is, the interfacing line width (S102).

Then, the memory interfacing units 31 to 34 checks a highest line speed of the checked interfacing lines (S103).

Due to the above operations S101 to S103, the memory interfacing units 31 to 34 can set optimal interfacing lines corresponding to the currently-connected data storage devices.

Then, all the checked available interfacing lines are driven at the checked highest line speed (S104).

Then, it is checked whether or not basic operations of the driven lines, that is, data communication is normally performed (S105). In addition, data delays of the driven lines are measured, and output timings of the entire interfacing lines are adjusted through compensation of delay between lines (S106).

In addition, a memory test for repetitively performing writing and reading various patterns from the memory interfacing units 31 to 34 to the corresponding data storage devices through the set interfacing lines is carried out (S107).

As a result of the memory test, if the currently-connected data storage device is in the normal state, a system addressing space mapped to the corresponding data storage device is allocated and registered in the memory port table, and the initialization operation is ended (S109). As a result of the memory test, if the currently-connected data storage device is not in the normal state, an error state is notified, and the initialization operation is ended without allocation and registration of the system addressing space (s110).

When the initialization operation is normally completed, the memory interfacing units 31 to 34 are designed with the interfacing line widths, and the corresponding system addressing spaces are allocated thereto. Accordingly, the reading and writing operations to the data storage devices through the memory interfacing units of which initialization operations are completed can be carried out.

Figure 10:
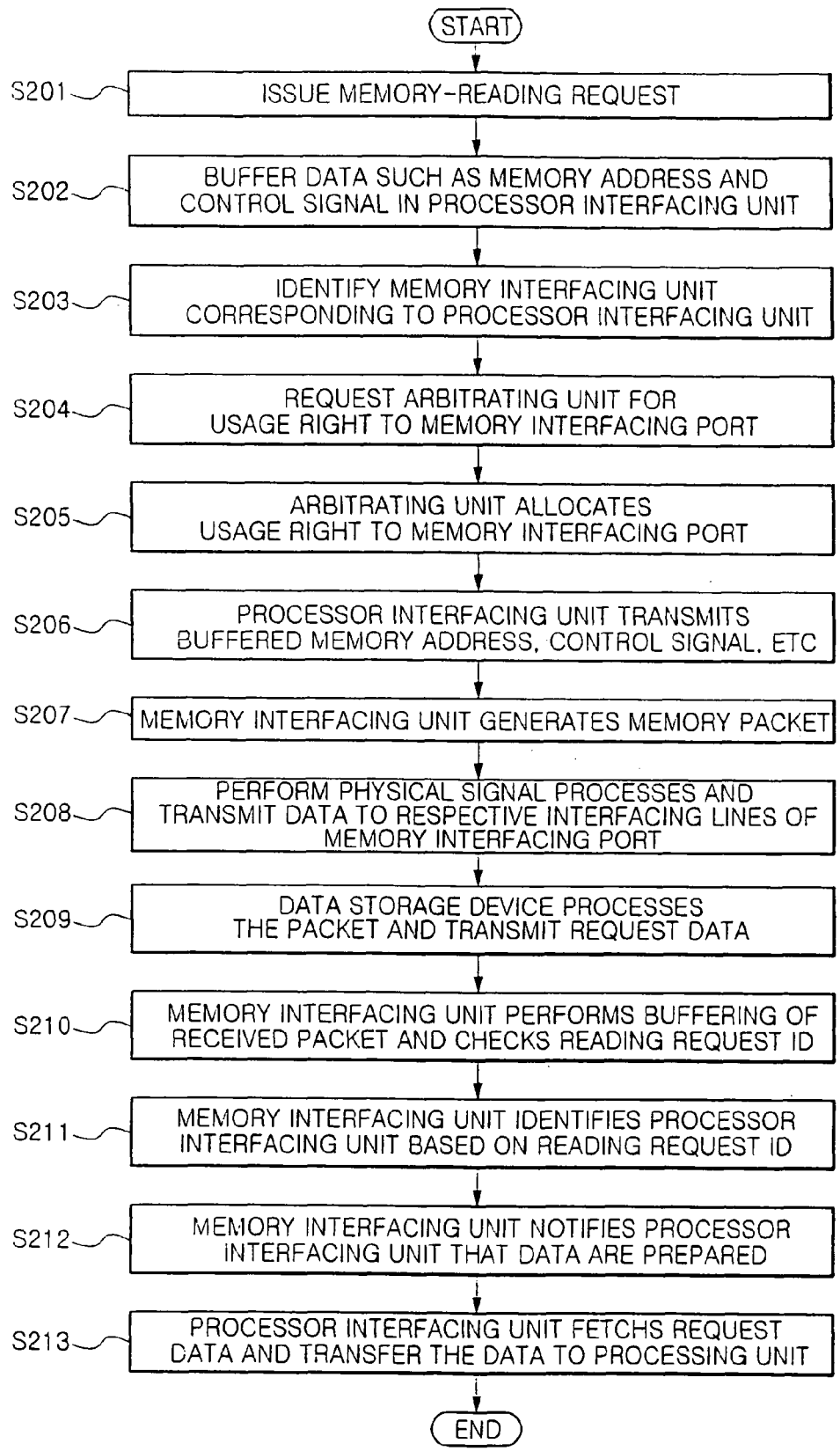
FIG. 10 is a flowchart illustrating a data reading operation of the memory switching control apparatus according to the present invention.

FIG. 10 is a flowchart illustrating a data reading operation of the memory switching control apparatus 1 according to an embodiment of the present invention.

Referring to FIG. 10, when a reading request is issued by an arbitrary processing unit, the reading request is received by a processor interfacing unit connected to the processing unit (hereinafter, assumed to be a first processor interfacing unit 11) (S201).

The first processor interfacing unit 11 that receives the reading request performs buffering of a memory address of which reading is requested by the processing unit and control signals (S202). The first processor interfacing unit 11 extracts information of a memory interfacing unit (hereinafter, assumed to be a memory interfacing unit 31) that is to read data from a currently-registered memory port table by using the buffered memory address information (S203).

Then, the first processor interfacing unit 11 requests for a memory-interfacing-port usage right to the controller 51 based on the extracted information of the memory interfacing unit 31 (S204).

In response to the usage-right request, the controller 51 allocates a usage right of memory interfacing port to the first processor interfacing unit 11 according to a current usability of the memory interfacing unit 31 and a priority of the first processor interfacing unit 11 that requests for the usage right and controls the selection unit 41 (S205). Therefore, the selection unit 41 connects a bus connected to the allocated first processor interfacing unit 11 to a bus connected to the memory interfacing unit 31. The first processor interfacing unit 11 outputs the buffered data associated with the memory reading request, that is, to-be-read memory addresses, control signals, and the like to transfer the buffered data to the memory interfacing unit 31 through selection unit 41 (S206).

The memory interfacing unit 31 that receives the data associated with the memory reading request in operation S206 generates an interfacing line packet for the reading request by combining the input data (S207). The data are subject to physical-layer processes and, after that, transferred to an interfacing line 81 connected to a data storage device 91 (S208).

The data storage device 91 connected to the interfacing line 81 receives the interfacing line packet for the reading request, processes the interfacing line packet to read out data from the requested memory address, and transmits the data to the memory interfacing unit 31 through the interfacing line 81 (S209). After transmitting the interfacing line packet for the reading request in operation S208, the memory interfacing unit 31 performs buffering of the interfacing line packet inputted from the data storage device 91, and the controller 51 checks a reading request ID included in the buffered interfacing line packet (S210). Then, based on the checked reading request ID, the memory interfacing unit identifies the processor interfacing unit that requests for the corresponding packet (S211). Based on a result of the checking, the selection unit 41 connects the identified first processor interfacing unit 11 to the memory interfacing unit 31.

Then, the controller 51 notifies the identified first processor interfacing unit 11 that the reading-requested data are prepared (S212).

Then, the first processor interfacing unit 11 receives the read data transmitted through the selection unit 41 and transfers the data to the processing unit (S213).

Accordingly, the arbitrary internal and external processing units can independently access a plurality of different-type and equal-type data storage devices through the memory switching control apparatus 1 so as to read desired data.

Now, a data writing operation for a memory through the memory switching control apparatus 1 will be described.

Figure 11:
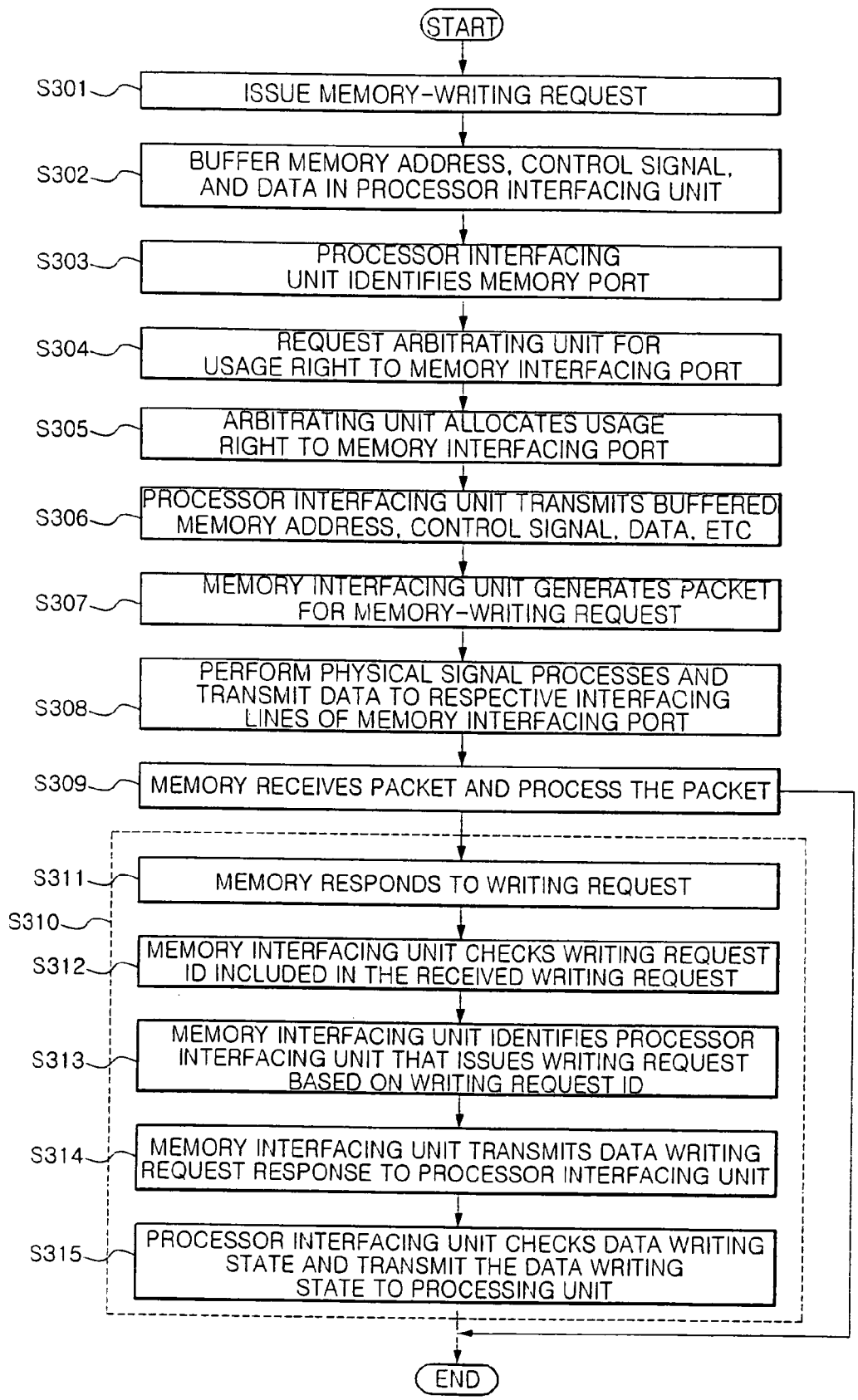
FIG. 11 is a flowchart illustrating an data writing operation of the memory switching control apparatus according to the present invention.

FIG. 11 is a flowchart illustrating a data writing operation of the memory switching control apparatus 1 according to an embodiment of the present invention.

Referring to FIG. 11, when a processing unit connected to one of the first processor interfacing units 11 to 13 and the second processor interfacing units 21 to 25 of the memory switching control apparatus 1 issues a memory writing request (S301), a corresponding processor interfacing unit (hereinafter, assumed to be a first processor interfacing unit 11) performs buffering of a writing-requested memory address, control signals, and data that are to be written in a memory (S302). The first processor interfacing unit 11 searches for a memory port table by using the buffered memory address so as to identify the memory interfacing unit corresponding to the memory address (S303).

Then, a usage right to a memory interfacing port is requested to a controller 51 of the identified memory interfacing unit (hereinafter, assumed to be a memory interfacing unit 31) (S304).

In response to the request for the usage right to the memory interfacing port, the controller 51 allocates the usage right to the memory interfacing port according to a current usability of the memory interfacing unit 31 and a priority of the first processor interfacing unit 11 that request for the usage right to the memory interfacing port (S305). At this time, the controller 51 controls the selection unit 41 to connect the first processor interfacing unit 11 to the memory interfacing unit 31.

The first processor interfacing unit 11 allocated with the usage right transfers the buffered data associated with the memory writing request, that is, to-be-written data, memory addresses, and control signals to the memory interfacing unit 31 (S306). The memory interfacing unit 31 configures the data with a predetermined memory packet and converts the memory packet to an interfacing line packet of which data width is adjusted according to a currently-set interfacing line width (S307). The interfacing line packet is subject to physical-layer processes and, after that, transferred to the interfacing line 81 (S308). The data storage device 91 that receives the memory writing-requested interfacing line packet through the interfacing line 81 converts the interfacing line packet to a memory packet, analyzes the memory packet, and stores the writing-requested data to the requested address (S309).

In a case where a writing completion and checking operation S310 is not needed, after the data storage device performs data writing in operation S309, the data writing operation is ended.

In a case where the writing and completion operation S310 is needed, after operation S309 is performed, the data storage device 91 transmits a response to the writing request through the interfacing line 81 (S311). The memory interfacing unit 31 receives the response to the writing request, and the controller 51 checks a writing request ID included in the received response packet (S312). Based on the checked writing request ID, the controller 51 identifies the processor interfacing unit that issues the writing request and controls the selection unit 41 so as to transmit the writing request response to the identified first processor interfacing unit 11 (S313). Then, the memory interfacing unit 31 outputs the received response to the data writing request to transmit the response to the first processor interfacing unit 11 through selection unit 41 (S314). The first processor interfacing unit 11 that receives the response checks a process state of the requested data writing operation based on the response and notifies the processing unit of the process state (S315).

The aforementioned method according to the present invention can be embodied as a program on a computer-readable recording medium (for example, a CDROM, a RAM, a ROM, a floppy disk, a hard disk, or an optical magnetic disk). Since technologies therefor are well known to the ordinarily skilled in the art, detailed description thereof is omitted.

Figure 12:
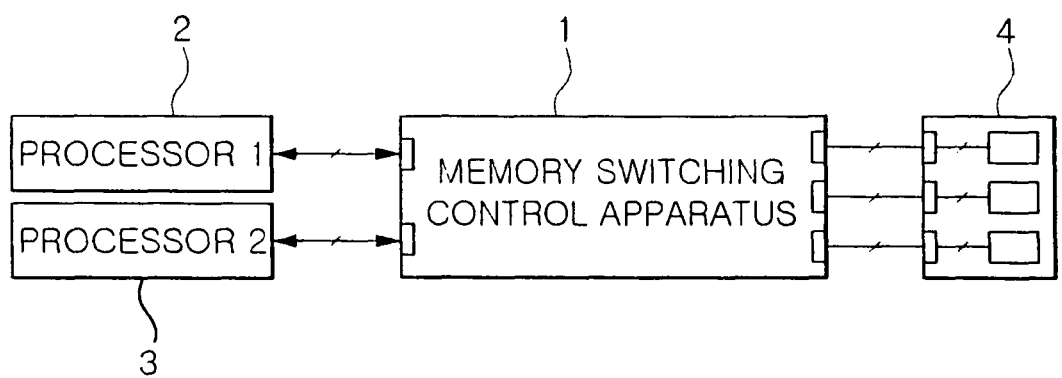
FIGS. 12 and 13 are block diagrams illustrating implementation examples of the memory switching control apparatus of the present invention.
Figure 13:
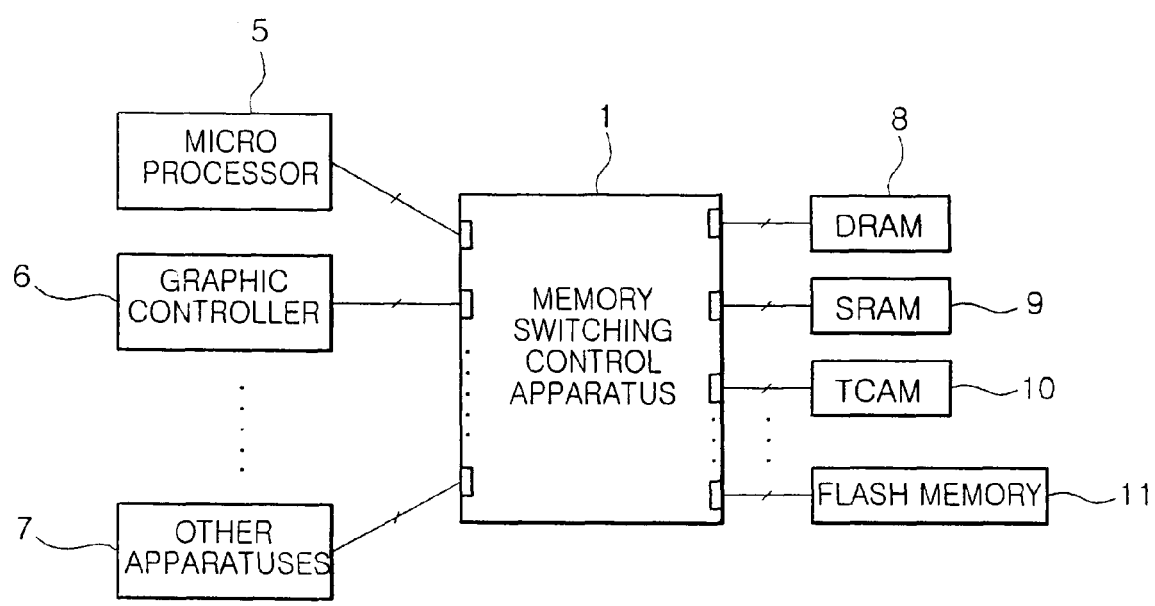

FIGS. 12 and 13 are block diagrams illustrating implementation examples of the memory switching control apparatus of the present invention.

As shown in FIG. 12, a memory switching control apparatus 1 according to the present invention is simultaneously connected to one or more processors 2 and 3, the memory switching control apparatus 1 is also connected to a plurality of independent serial interfacing ports of a data storage device 4 having a plurality of memory devices, so that memory switching control apparatus 1 can arbitrate the processors 2 and 3 to independently access the plurality of memory devices included in the data storage device 4.

In addition, as shown in FIG. 13, a memory switching control apparatus 1 according to the present invention is connected to a microprocessor 5, a graphic controller 6, and other apparatuses 7, and the memory switching control apparatus 1 is simultaneously connected to different-type data storage devices 8 to 11, so that the memory switching control apparatus 1 can arbitrate the microprocessor 5, the graphic controller 6, and other apparatuses 7 to use independently the different-type data storage devices 8 to 11.

According to the present invention, various types of data storage devices can be connected in the same standard of a serial interfacing scheme, so that it is possible to enhance flexibility in use of memories and a memory switching control apparatus. In addition, data input and output through memory interfacing ports can be independently performed, so that it is possible to reduce a bottle neck of memory interfaces. In addition, positions of addressing spaces according to the memory interfacing ports can be changed, so that it is possible to flexibly dispose the addressing spaces in the entire memories associated with changing or replacement of memories. In addition, it is possible to easily cope with disorder of a specific memory. In addition, widths of serial interfacing lines can be changed, so that it is possible to implement interfacing of various types of data storage devices.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A memory switching control apparatus using an open serial interfacing, comprising:
   one or more processor interfacing units which perform interfacing with one or more processing units, the processing units including internal and external processing units;
   one or more memory interfacing units which respectively have open-serial-interfacing-scheme memory interfacing ports to interface with data storage devices connected to the memory interfacing ports in a serial interfacing scheme;
   one or more of arbitrating units, which are respectively provided corresponding to the one or more memory interfacing units, to independently arbitrate usage rights of the one or more processor interfacing units to the one or more memory interfacing units; and
   a memory port table which manages memory start addresses respectively allocated to the one or more memory interfacing units, memory sizes of the data storage devices connected to the memory interfacing ports or memory end addresses allocated to system addressing regions allocated to the one or more memory interfacing units, and state information of the one or more memory interfacing units,
   wherein each of the one or more processor interfacing units comprises:
      a data buffer which temporarily stores data, a memory address, a control signal, and a state signal inputted to and outputted from the processing unit and adjusts data width and speed of data inputted to and outputted from one of the one or more memory interfacing units, and
      a decoder and a controller which identifies one of the one or more memory interfacing units which is to be requested to be accessed, based on the memory address, the control signal, and the state signal stored in the data buffer and the memory port table, requests for a usage right, and adjusts a data exchange timing for the one of the one or more memory interfacing units.

2. The memory switching control apparatus of claim 1, wherein a number of interfacing lines of the one or more memory interfacing units is varied according to required bandwidths of the connected data storage devices.

3. The memory switching control apparatus of claim 1, wherein each of the one or more memory interfacing units comprises:
   a link unit which generates memory packets by combining data bus signals and control bus signals applied by the one or more processor interfacing units, converts the memory packets to interfacing line packets by adjusting data widths of the memory packets, converts the interfacing line packets to memory packets, and extracts data bus signals and control bus signals from the memory packets; and
   a physical-layer processor which performs a physical-layer process on the interfacing line packets inputted and outputted between the link unit and interfacing lines.

4. The memory switching control apparatus of claim 3, wherein the physical-layer processor is constructed with one or more of:
   a scrambling/descrambling unit which performing scheduled data conversion and recovery so as to reduce electro magnetic interference (EMI) caused from occurrence of data having a repetitive equal pattern in the interfacing line packet;
   an encoding/decoding unit which performs encoding and decoding so as to facilitate clock synchronization for the interfacing line packet, maintain a DC voltage balance of the interfacing line, and limit a frequency band of a data pattern; and
   a data aligning unit which compensates for data delays between the interfacing lines.

5. The memory switching control apparatus of claim 3, wherein the memory packet comprises:
   an information block including one or more of interfacing scheme version information, ID indicating an memory-accessing request entity and a sequence number, a memory address, a data size, control information, state information, and an error check code; and
   a data block including reading data and writing data.

6. The memory switching control apparatus of 5, wherein the ID is generated by combining information of a processor interfacing unit which issues the memory-accessing request and specific request sequence information of the processor interfacing unit, wherein the processor interfacing unit is one of the one or more processor interfacing units.

7. The memory switching control apparatus of claim 1, wherein the memory start addresses, the memory sizes or the memory end addresses allocated to each of the one or more memory interfacing unit is varied according to a memory capacity of the data storage device connected to the one of the one or more memory interfacing units.

8. The memory switching control apparatus of claim 1, wherein one of the one or more processor interfacing units is one of:
   a first processor interfacing unit which is directly connected to a processing unit through an internal bus to interface a memory access to the processing unit; and
   a second processor interfacing unit which is connected to an external processing unit through an external interface to interface a memory access to the external processing unit.

9. The memory switching control apparatus of claim 1, wherein each of the one or more of arbitrating units comprises:
   a controller which allocates a usage right to one of the memory interfacing ports to the one or more processor interfacing units based on a usability of the one or more memory interfacing units and priorities of the one or more processor interfacing units when a request for the usage right to the one of the memory interfacing ports is received from the one or more processor interfacing units; and
   a selection unit which selectively connects the one or more processor interfacing units to the one of the one or more memory interfacing units according to the usage right allocated by the controller.

10. A memory switching control apparatus using an open serial interfacing, comprising:
   one or more processor interfacing units which perform interfacing with one or more processing units, the processing units including internal and external processing units;
   one or more memory interfacing units which respectively have open-serial-interfacing-scheme memory interfacing ports to interface with data storage devices connected to the memory interfacing ports in a serial interfacing scheme;
   one or more of arbitrating units, which are respectively provided corresponding to the one or more memory interfacing units, to independently arbitrate usage rights of the one or more processor interfacing units to the one or more memory interfacing units; and
   a memory port table which manages memory start addresses respectively allocated to the one or more memory interfacing units, memory sizes of the data storage devices connected to the memory interfacing ports or memory end addresses allocated to system addressing regions allocated to the one or more memory interfacing units, and state information of the one or more memory interfacing units,
   wherein each of the one or more memory interfacing units comprises:
      a link unit which generates memory packets by combining data bus signals and control bus signals applied by the one or more processor interfacing units, converts the memory packets to interfacing line packets by adjusting data widths of the memory packets, converts the interfacing line packets to memory packets, and extracts data bus signals and control bus signals from the memory packets, and
      a physical-layer processor which performs a physical-layer process on the interfacing line packets inputted and outputted between the link unit and interfacing lines, wherein the link unit comprises:
         a data input/output bus through which data bus signals including reading data and writing data are inputted to and outputted from the one or more processor interfacing units,
         a control input bus through which control bus signals including memory addresses, reading control signals, writing control signals, and state signals are inputted from the one or more processor interfacing units,
         a control output bus through which the control bus signals including the memory addresses, the reading control signals, the writing control signals, and the state signals are outputted to the one or more processor interfacing units,
         a data mixing/extracting unit which mixes the data bus signals inputted through the data input/output bus and the control bus signals inputted through the control input bus to output memory packets and extracts data bus signals and control bus signals from inputted memory packets to output the data bus signals and the control bus signals through the data input/output bus and the control output bus, and
         an asymmetric buffer unit which adjusts widths of the memory packets outputted from the data mixing/extracting unit to convert the memory packets to interfacing line packets or adjusts data widths of the inputted interfacing line packets to convert the interfacing line packets to the memory packets to output the memory packets to the data mixing/extracting unit.

11. The memory switching control apparatus of claim 10, wherein the asymmetric buffer unit comprises:
   an asymmetric bidirectional data buffer which has A and B sides in an asymmetric input/output structure to temporarily store memory packets inputted from the A side and output interfacing line packets through the B side and temporarily store interfacing line packets inputted from the B side and output memory packets through the A side;
   an input/output control circuit which controls input and output flows of the memory packets and the interfacing line packets of the asymmetric bidirectional data buffer.

12. The memory switching control apparatus of claim 11 wherein the input/output control circuit comprises a plurality of 3-state buffers which are provided to output lines of the memory packets and the interfacing line packets to operate in an open state or a normal state according to input and output of data.

13. The memory switching control apparatus of claim 10, wherein the asymmetric buffer unit comprises:
   a first asymmetric bidirectional data buffer which has A and B sides in an asymmetric input/output structure to receive memory packets through the A side and temporarily store the packets and output interfacing line packets through the B side;
   a second asymmetric bidirectional data buffer which has A and B sides in an asymmetric input/output structure to receive interfacing line packets through the A side and temporarily store the interfacing line packets and output memory packets through the B side;
   an input/output control circuit which controls input and output flows of the memory packets and the interfacing line packets of the first asymmetric bidirectional data buffer and the second asymmetric bidirectional data buffer.

14. The memory switching control apparatus of claim 10, wherein the asymmetric buffer unit comprises:

a plurality of asymmetric bidirectional data buffers, each of which has A and B sides in an asymmetric input/output structure to input and output memory packets through the A side and input and output interfacing line packets through the B side, wherein data widths inputted and outputted through the B side are set to be different;

an input/output control circuit which controls input and output flows of the memory packets and the interfacing line packets of the asymmetric bidirectional data buffers; and a selection unit which selects an asymmetric bidirectional data buffer according to the widths of interfacing lines so as for the asymmetric bidirectional data buffer having the same data width to input and output the interfacing line packets.

15. The memory switching control apparatus of claim 14, wherein the selection unit checks the number of available interfacing lines among the interfacing lines connected to the data storage devices at an initial operation and performs the selection operation according to the number of available interfacing lines.

16. The memory switching control apparatus of claim 10, wherein the asymmetric buffer unit comprises:

a plurality of first asymmetric bidirectional data buffers, each has A and B sides in an asymmetric input/output structure to receive memory packets through the A side and output interfacing line packets through the B side, wherein data output widths of the B side are set to be different;

a plurality of second asymmetric bidirectional data buffers, each has A and B sides in an asymmetric input/output structure to receive interfacing line packets through the A side and output memory packets through the B side, wherein data output widths of the A side are set to be different;

an input/output control circuit which controls input and output flows of the memory packets and the interfacing line packets of the first asymmetric bidirectional data buffer and the second asymmetric bidirectional data buffer; and a selection unit which selects first and second asymmetric bidirectional data buffers according to the widths of interfacing lines so as for the first and second asymmetric bidirectional data buffers having the same data width to input and output the interfacing line packets.

17. An operating method of a memory switching control apparatus using an open serial interfacing scheme, the memory switching control apparatus having a plurality of processor interfacing units connected to a plurality of processing units, a plurality of memory interfacing units connected to a plurality of data storage devices, and a plurality of arbitrating units arbitrating usage right to the plurality of memory interfacing units, the operating method comprising:

if an initialization operation is started, driving the plurality of memory interfacing units at corresponding lowest speeds so as to check the number of available interfacing lines;

checking a highest speed of the checked available interfacing lines; and driving all the checked available interfacing lines at the checked highest speed so as to determine whether or not the available interfacing lines operate normally;

measuring data delays between the interfacing lines that are determined to operate normally and compensating for the data delays between the interfacing lines;

performing a memory test for data storage devices connected to the normally-operated interfacing lines; and if the result of the memory test is normal, allocating system addressing spaces mapped to the data storage devices to each of the plurality of memory interfacing units and registering thereof in a memory port table.

18. The operating method of claim 17, further comprising, if the result of the memory test is not normal, notifying an error state.

19. The operating method of claim 17, further comprising:

if a reading request issued from an arbitrary processing unit, a corresponding processor interfacing unit buffering a memory address of which reading is requested by the processing unit and a control signal;

the processor interfacing unit identifying a memory interfacing unit that is to read data from a currently-registered memory port table by using the buffered memory address information;

the processor interfacing unit requesting for a usage right to a memory interfacing port to an arbitrating unit of the identified memory interfacing unit;

the arbitrating unit allocating a usage right of a memory interfacing port to the processor interfacing unit according to a usability of the memory interfacing unit and a priority of the processor interfacing unit;

applying the memory address and the control signal buffered in the processor interfacing unit through the memory interfacing unit to the data storage device according to the allocation;

the memory interfacing unit receiving the reading-requested data from the data storage device;

the arbitrating unit identifying the processor interfacing unit which requests for data received by the memory interfacing unit;

transferring the data received by the memory interfacing unit to the identified processor interfacing unit; and the processor interfacing unit receiving the data and transferring the data to the corresponding processing unit.

20. The operating method of claim 19, further comprising after the identifying of the processor interfacing unit that requests for the received data, the arbitrating unit notifying the identified processor interfacing unit that the reading-requested data are prepared.

21. The operating method of claim 17, further comprising:

if a writing request is issued from an arbitrary processing unit, a processor interfacing unit connected to the processing unit buffering a memory address of which writing is requested by the processing unit, a control signal, and data that are to be written in a memory;

the processor interfacing unit identifying a memory interfacing unit corresponding to the memory address by searching for the memory port table by using the buffered memory address;

the processor interfacing unit requesting for a usage right to a memory interfacing port to an arbitrating unit of the identified memory interfacing unit;

the arbitrating unit allocating a usage right of memory interfacing port to the processor interfacing unit according to a usability of the memory interfacing unit and a priority of the processor interfacing unit;

transferring the data, the memory address, and the control signal buffered in the processor interfacing unit which is allocated with the usage right to the memory interfacing unit; and the memory interfacing unit transmitting the data, the memory address, and the control signal to the data storage device so as to request for writing.

22. The operating method of claim 21, further comprising:
the memory interfacing unit receiving an response to the writing request from the data storage device;
the arbitrating unit identifying a processor interfacing unit to which the response received by the memory interfacing unit is transferred;
the memory interfacing unit transferring the received response to the identified processor interfacing unit; and
the processor interfacing unit transmitting the transferred response to the corresponding processing unit.

23. A data storage device comprising:
one or more memory devices; and
one or more memory interfacing units, each of which an open-serial-interfacing scheme memory interfacing port separately or commonly connected to the memory devices, wherein each of the one or more memory interfacing units comprises:
   a link unit which generates memory packets by combining data bus signals and control bus signals applied by one or more processor interfacing units, converts the memory packets to interfacing line packets by adjusting data widths of the memory packets, converts the interfacing line packets to memory packets, and extracts data bus signals and control bus signals from the memory packets, and
   a physical-layer processor which performs a physical-layer process on the interfacing line packets inputted and outputted between the link unit and interfacing lines,
wherein the link unit comprises:
   a data input/output bus through which data bus signals including reading data and writing data are inputted to and outputted from the one or more processor interfacing units,
   a control input bus through which control bus signals including memory addresses, reading control signals, writing control signals, and state signals are inputted from the one or more processor interfacing units,
   a control output bus through which the control bus signals including the memory addresses, the reading control signals, the writing control signals, and the state signals are outputted to the one or more processor interfacing units,
   a data mixing/extracting unit which mixes the data bus signals inputted through the data input/output bus and the control bus signals inputted through the control input bus to output memory packets and extracts data bus signals and control bus signals from inputted memory packets to output the data bus signals and the control bus signals through the data input/output bus and the control output bus, and
   an asymmetric buffer unit which adjusts widths of the memory packets outputted from the data mixing/extracting unit to convert the memory packets to interfacing line packets or adjusts data widths of the inputted interfacing line packets to convert the interfacing line packets to the memory packets to output the memory packets to the data mixing/extracting unit.

* * * * *